US008725068B2

(12) United States Patent
Almonte

(10) Patent No.: US 8,725,068 B2
(45) Date of Patent: May 13, 2014

(54) REPEATER DESIGN AND VERIFICATION TOOL

(75) Inventor: Samuel Almonte, Santa Clarita, CA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 12/950,839

(22) Filed: Nov. 19, 2010

(65) Prior Publication Data
US 2012/0129448 A1 May 24, 2012

(51) Int. Cl.
*H04B 7/185* (2006.01)

(52) U.S. Cl.
USPC ........... 455/13.1; 455/12.1; 455/427; 703/22; 703/13

(58) Field of Classification Search
USPC ................ 455/423, 424, 67.11, 67.12, 67.15; 370/316, 315; 342/352, 353, 357.26; 703/1, 13–15, 22
See application file for complete search history.

(56) References Cited

U.S. PATENT DOCUMENTS

| | | | |
|---|---|---|---|
| 6,421,541 B1 * | 7/2002 | Karlsson et al. | 455/509 |
| 6,771,930 B2 * | 8/2004 | Buer | 455/13.4 |
| 7,010,442 B2 * | 3/2006 | Fender | 702/68 |
| 7,085,697 B1 * | 8/2006 | Rappaport et al. | 703/13 |
| 7,965,136 B2 * | 6/2011 | Rhodes et al. | 330/2 |
| 8,112,261 B2 * | 2/2012 | Song et al. | 703/13 |

OTHER PUBLICATIONS

Tutorials Web; "Satellite Link Budget Calculator page".*
Satellite Signals, "Satellite Link Budget Calculator".*
Mekechuk et al., "Linearizing Power Amplifiers Using Digital Predistortion, EDA Tools and Test Hardware", High Frequency Electronics, Apr. 2004, pp. 18-24.*
Tutorials Web; "Satellite Link Budget Calculator page," available at <http://www.tutorialsweb.com/satcom/satellite-link-budget-calculator.htm>, last visited Nov. 18, 2010.
Satellite Signals, "Satellite Link Budget Calculator," available at <http://www.satsig.net/linkbugt.htm>, last visited Nov. 18, 2010.
Arrowe, "Satmaster Pro," available at <http://www.arrowe.com/linkbudget.html>, last visited Nov. 18, 2010.
Noise Figure Calculator, available at <http://www1.sphere.ne.jp/i-lab/ilab/tool/NF_e.htm>, last visited Nov. 18, 2010.

* cited by examiner

*Primary Examiner* — Nay A Maung
*Assistant Examiner* — Angelica M Perez

(57) ABSTRACT

The performance of a repeater path may be predicted by identifying the parameters of a transmitting earth, a receiving earth station, and the component performance parameters of at least one of the gain, loss and noise figure of at least one of repeater components in the repeater path. The component performance parameters, the transmitting and receiving earth station parameters, and the predicted repeater performance may be communicated and/or displayed via a graphical user interface.

19 Claims, 8 Drawing Sheets

REPEATER DESIGN AND VERIFICATION TOOL

FIELD

The present disclosure relates generally to communication systems and, more particularly, to a system and method for designing and validating a repeater configuration.

BACKGROUND

In a communications system, a repeater such as a satellite may receive a signal from an earth station and re-transmit the signal for receipt by another earth station. The signal is initially transmitted from the earth station with a certain amount of signal power. During the initial transmission of the signal from the earth station to the repeater on the uplink, and as the signal is processed by the repeater and re-transmitted to the receiving earth station on the downlink, a portion of the signal power is consumed. In addition, power may be added to the signal by one or more amplifiers that may be included with the repeater.

Ideally, the signal is received at the receiving ground station with sufficient power such that the signal possesses a desired signal quality. Furthermore, it is generally desirable to minimize the amount of power expended by the repeater such as power expended in amplifying the signal power prior to the downlink. Likewise it is generally desirable to minimize losses that may occur in the signal power during processing of the signal by the repeater.

In the design and development of a repeater system, a developer may incorporate a variety of different repeater components including, without limitation, filters, multiplexers, amplifiers and other components. Each component has losses and gains associated therewith that affect the gain and loss in signal power as the signal is processed by the repeater. Furthermore, components that have the same configuration and which may be manufactured by the same manufacturer may have different performance characteristics such as different gain, loss and noise values.

In this regard, repeater systems having identical configurations with identical components may exhibit different performance characteristics due to the cumulative effect of the individual gains or losses of the repeater components. The cumulative effect of the repeater components may cause certain repeaters to fall outside of established operating specifications and may require the costly and time-consuming replacement of components of the physical model followed by re-testing of the repeater. The scenario may be repeated in an iterative process until the repeater includes the set of components that allow the repeater to operate within specifications.

As can be seen, there exists a need in the art for a system and method for designing and developing a repeater system that allows for analysis of repeater performance with a variety of different components without the need to test a physical model of the repeater.

SUMMARY

The above-noted needs associated with the design and development of repeater systems are addressed and alleviated by the present disclosure which, in an embodiment, provides a method of evaluating a repeater path comprising the steps of identifying parameters of a transmitting earth station and a receiving earth station and identifying component performance parameters including at least one of gain, loss and noise figure of at least one of the repeater components in the repeater path. The method may further include predicting repeater performance of the repeater path as a function of the parameters of the transmitting and receiving earth stations and the component performance parameters of at least one of the gain, loss and noise figure of at least one of the repeater components. The method may additionally include communicating the component performance parameters including at least one of the gain, loss and noise figure of the repeater components, the parameters of the transmitting and receiving earth station, and the predicted repeater performance. The method may further include adjusting at least one of the gain, loss and noise figure of the component performance parameters to manage the predicted repeater performance to be within a predetermined range of desired repeater performance.

In a further embodiment, disclosed is a method of determining the performance of a bent-pipe repeater path comprising the steps of providing a physical model of the repeater path having input and output ends and predicting repeater performance of the repeater path as a function of parameters of a transmitting earth station, a receiving earth station, and component performance parameters of at least one of the gain, loss and noise figure of at least one of a plurality of repeater components. The method may include calculating a repeater input power level and a repeater output power level at the respective input and output ends and corresponding to the predicted repeater performance. A synthesized test RF signal may be applied to the input end. The test RF signal may have a magnitude that may be substantially equivalent to the calculated repeater input power level. The method may further include measuring, using a downlink power meter coupled to the output end, a repeater power output level in response to application of the test RF signal. The method may additionally include determining actual repeater performance based on the difference between the measured repeater output power level and the calculated repeater output power level.

In a further embodiment, disclosed is a method of evaluating a bent-pipe repeater path of an on-orbit spacecraft. The method may comprise the steps of identifying parameters of transmitting and receiving earth stations and component performance parameters of repeater components included in the repeater path. The method may further include receiving telemetry data from the on-orbit spacecraft, the telemetry data including actual repeater performance and identifying an actual uplink effective isotropic radiated power (EIRP) and an actual uplink atmospheric loss associated with the actual repeater performance. The estimated uplink EIRP and the estimated uplink atmospheric loss may be adjusted to be substantially equivalent to the actual uplink EIRP and the actual uplink atmospheric loss. The method may include predicting repeater performance as a function of the performance parameters of the repeater components and the transmitting and receiving earth stations and the adjusted estimated uplink EIRP and adjusted estimated uplink atmospheric loss. The method may also include calculating a difference between the predicted repeater performance and the actual repeater performance and then adjusting the component performance parameters of the repeater components until the difference between the predicted repeater performance and the actual repeater performance is within a predetermined range.

Also disclosed is a repeater path evaluation system which may comprise a system manager, a performance calculator, and a graphical user interface. The system manager may be adapted to capture a plurality of discrete parameters for one or more of a transmitting earth station and receiving earth station, and one or more repeater component performance parameters including at least one of gain, loss and noise figure of one or more repeater components in the repeater path. The performance calculator may be in communication with the system manager and may be configured to calculate predicted repeater performance of the repeater path as a function of the parameters of the transmitting and receiving earth stations and the at least one of the gain, loss and noise figure of the one or more repeater components. The graphical user interface may display the real-time predicted discrete performance parameters for the one or more of the transmitting and receiving earth stations and the at least one of the gain, loss and noise figure of the one or more repeater components. The graphical user interface may enable reconfiguration of at least one of the plurality of discrete parameters of the transmitting and receiving earth stations and the repeater component performance parameters of at least one of the gain, loss and noise figure to enable the predicted repeater performance to be within a predetermined range of desired repeater performance The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
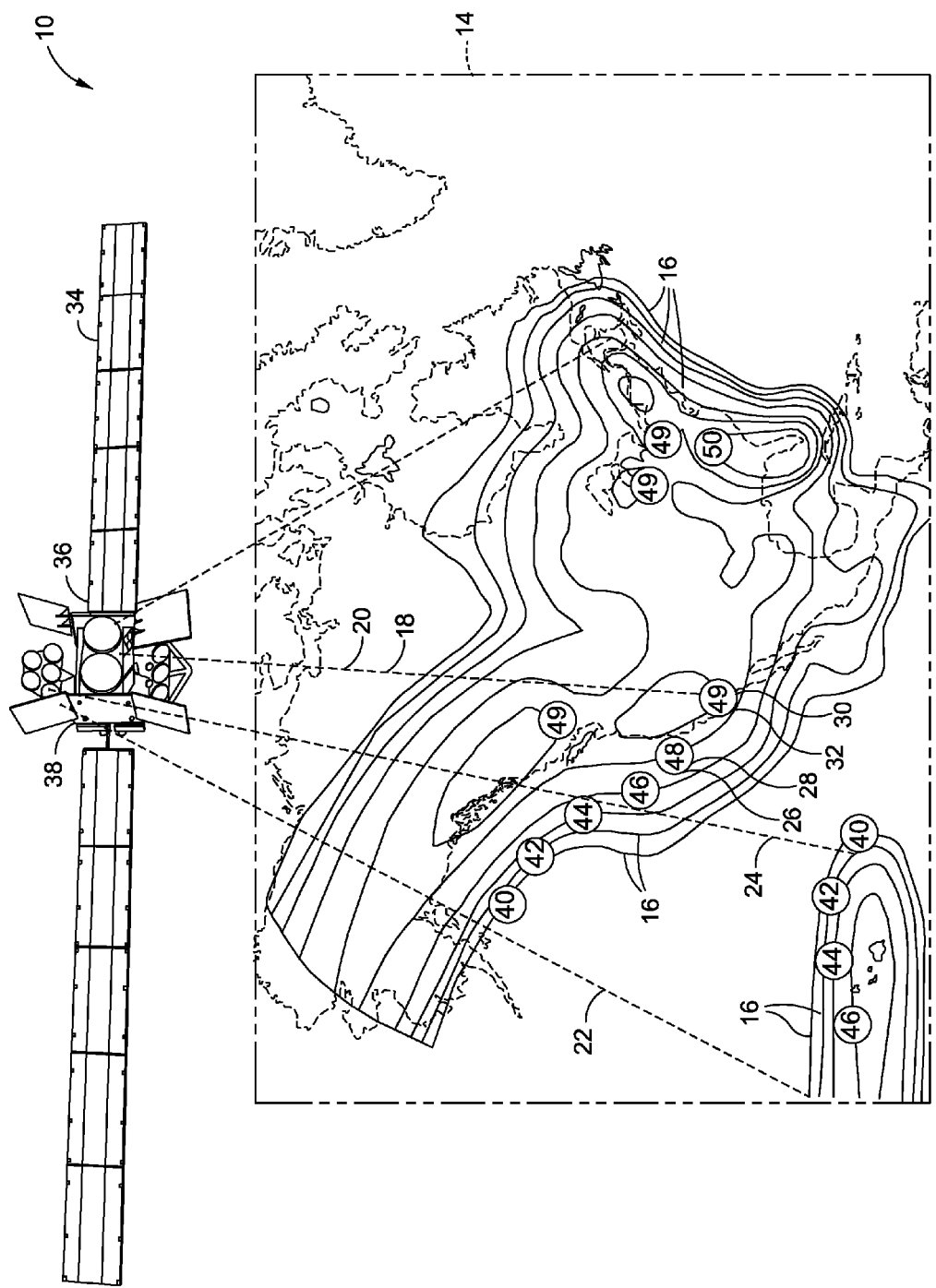
FIG. 1 is a schematic illustration of a repeater spacecraft and a uplink and downlink coverage footprint.

Referring now to the drawings wherein the showings are for purposes of illustrating preferred and various embodiments of the disclosure, shown in FIG. 1 is a schematic illustration of a spacecraft 34 transmitting uplink and downlink signals 20, 24 along uplink and downlink paths 18, 22 and defining a downlink coverage footprint 16 over a portion of the Earth 14. The spacecraft 34 may incorporate a repeater 36 defining a repeater path 38 which may be configured as a bent-pipe repeater 36. The repeater path 38 may be configured to receive radio frequency (RF) signals from one or more transmitting earth stations 26 and re-transmitting the RF signals to one or more receiving earth stations 30.

Figure 2:
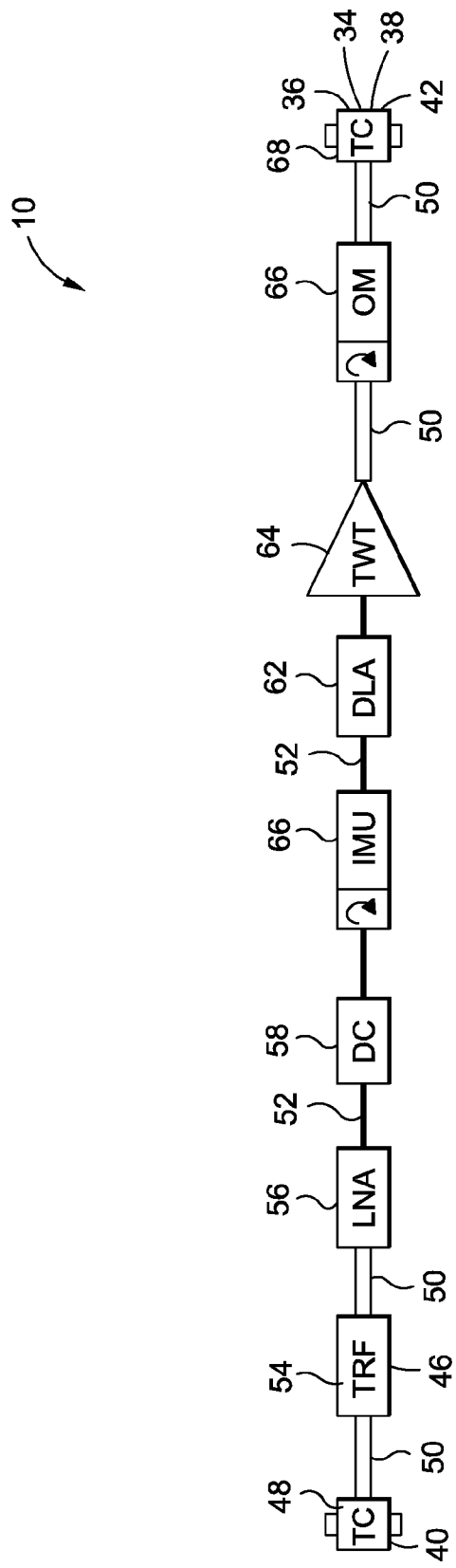
FIG. 2 is a schematic illustration of an embodiment of a repeater path as may be incorporated into the spacecraft.
Figure 3:
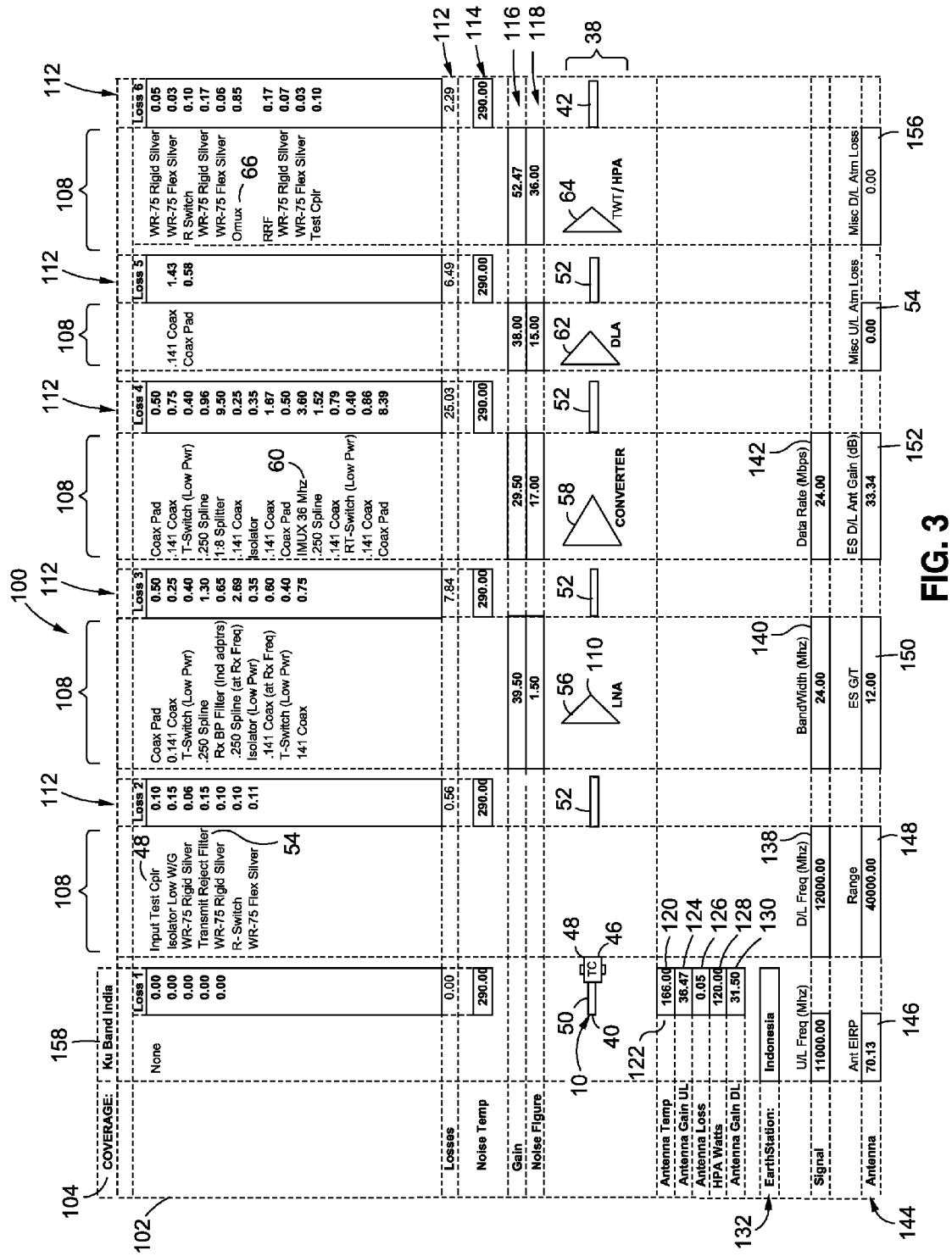
FIG. 3 is an illustration of an embodiment of a system manager for entering parameters of components of the repeater path.
Figure 4:
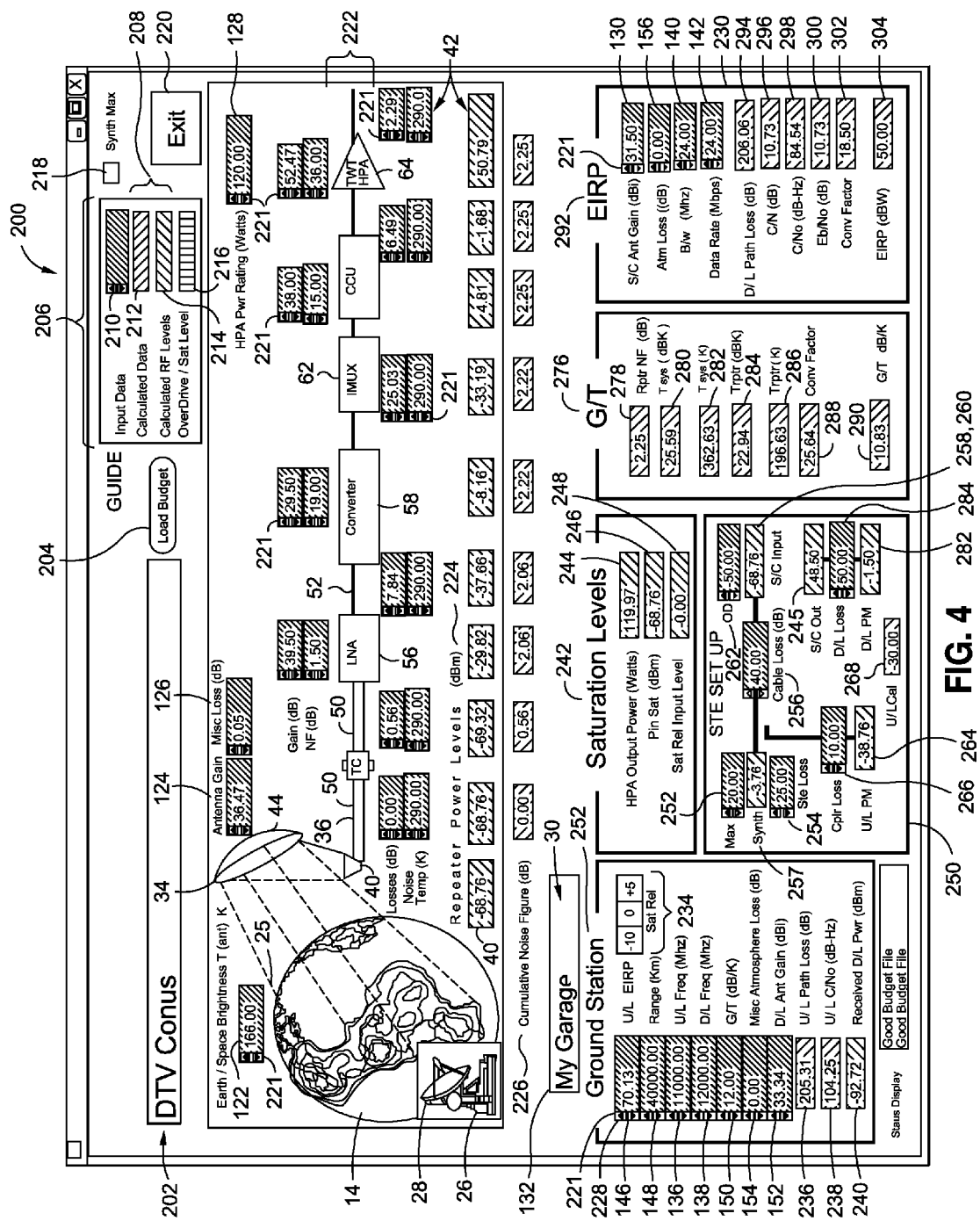
FIG. 4 is an illustration of an embodiment of a graphical user interface for evaluating the repeater path.

The repeater path 38 may be designed, developed and evaluated using an evaluation system 100 (FIG. 3) as disclosed herein. The evaluation system 100 may include a system manager 102 similar to that which is illustrated in FIG. 3 and which may be linked to a graphical user interface 200 (GUI) similar to that which is illustrated in FIG. 4. Advantageously, the evaluation system 100 provides a means wherein the discrete values or performance parameters of the repeater components 46 (FIG. 2) that make up the repeater path 38 (FIG. 1) may be adjusted to evaluate the effect on predicted repeater performance 208 (FIG. 4) of the repeater path 38 (FIG. 1). In addition, parameters of the transmitting and receiving earth stations 26, 30 shown in FIG. 1 may be adjusted to evaluate the effect on the predicted repeater performance 208 (FIG. 4) of the repeater path 38. For example, one of the indicators of predicted repeater performance 208 may comprise the level of power emitted by a transmitting antenna of the repeater 36 (FIG. 1) in transmitting an RF signal in the downlink direction toward a receiving earth station 30. The power emitted by the repeater transmitting antenna may be defined as the effective isotropic radiated power (EIRP) and may represent the strength or magnitude of the signal emitted by the repeater transmitting antenna along a downlink direction.

In an embodiment, the evaluation system 100 (FIG. 3) and method disclosed herein may facilitate the prediction of repeater path 38 (FIG. 1) performance for comparison to a desired repeater path performance. As shown in FIG. 2, the repeater path 38 may be comprised of repeater components 46 each having discrete component performance parameters 110 (FIGS. 3-4). Component performance parameters 110 such as gain 116, loss 112, noise figure 118 and noise temperature 114 (FIG. 3) of the repeater components 46 (FIG. 2) may be identified or obtained and may be entered into the system manager 102 of FIG. 3. After identifying and loading the component performance parameters 110 for the repeater components 46 of a given repeater path 38 configuration into the system manager 102 (FIG. 3), the performance of the repeater 36 may be predicted and communicated or displayed via the graphical user interface 200 (FIG. 4).

The component performance parameters 110 may be adjusted using the graphical user interface 200 in FIG. 4 until the predicted repeater performance 208 (FIG. 4) of the repeater path 38 falls within a predetermined range of desired repeater path performance. For example, the repeater path 38 may have a repeater receiving antenna 44 (FIG. 1) for receiving an uplink signal 20 (FIG. 1) transmitted along the uplink path 18 (FIG. 1) by a transmitting earth station antenna 28 (FIG. 1). The repeater receiving antenna 44 may have repeater receiving antenna parameters 120 (FIG. 3) including a gain parameter representing the amplification that the repeater receiving antenna 44 provides to the uplink signal 20 when the uplink signal 20 is received by the repeater receiving antenna 44.

Referring briefly to FIG. 4, the graphical user interface 200 provides a means for adjusting the gain 116 (FIG. 3) and/or other component performance parameters 110 (FIG. 3) of the repeater components 46 to evaluate the effect on the predicted downlink effective isotropic radiated power (EIRP) 304 (FIG. 4) and/or the predicted gain-to-noise-temperature ratio ("G/T") 290 (FIG. 4) and other path performance parameters of the repeater path 38 as described in greater detail below. In the gain-to-noise-temperature ratio ("G/T") of an antenna, "G" represents the gain of the antenna and "T" represents the system noise temperature of the antenna.

In addition, the evaluation system 100 (FIG. 3) and method provide a means to validate the operating characteristics of a physical model of the repeater path 38 (FIG. 1) constructed with repeater components that may have the same component performance parameters 110 defined during the design and development of the repeater path 38 using the evaluation system 100. In addition, the evaluation system 100 and method disclosed herein may provide a means to analyze the performance of an on-orbit satellite carrying the repeater path 38 designed, developed and ground-tested using the evaluation system 100. It should be noted that the evaluation system 100 and method disclosed herein is not limited to the design, development and evaluation (i.e., testing) of a repeater path 38 of a communications system 10 (FIG. 1) of a satellite repeater but may be applied to any RF communications system, without limitation, including any marine, land, airborne or spaced-based communications system or any combination of such systems.

Referring to FIG. 2, shown is a non-limiting embodiment of a repeater path 38 for which the evaluation system 100 (FIG. 3) may calculate predicted repeater performance. The repeater path 38 illustrated in FIG. 2 includes an input end 40 to which a repeater receiving antenna 44 (FIG. 4) may be coupled. As shown in FIG. 2, an input test coupler 48 and an output test coupler 68 may be located at the respective input end 40 and output end 42 of the repeater path 38 to facilitate the testing and validation of a physical model of the repeater path 38. For example, as described in greater detail below, test equipment may be coupled to the input and output end 40, 42 of the repeater path 38 and a synthesized test RF signal 260 (FIG. 4) may be applied to the repeater path 38 at the input end 40 (FIG. 4) to measure the strength of the signal at the output end 42 (FIG. 4) during ground testing prior to placing the repeater 36 (FIG. 1) into service.

Referring still to FIG. 2, the repeater path 38 may include one or more repeater components 46 for processing an uplink signal 20 (FIG. 1) received by the repeater receiving antenna 44 (FIG. 4). For example, as shown in FIG. 2, the test coupler 48 may be coupled to a transmit reject filter 54 ("TRF") which may be included in the repeater path 38 for rejecting signals that may be transmitted by the repeater transmitting antenna (not shown) and which may undesirably interfere with the operation of the repeater 36 (FIG. 1). The TRF 54 may be coupled to the input test coupler 48 by means of a waveguide 50 or other suitable signal conduit. The repeater path 38 may also include a low noise amplifier 56 ("LNA") for amplifying the signal received by the repeater receiving antenna 44. The LNA 56 may also be communicatively coupled to the TRF 54 by means of a waveguide 50 or other suitable device. The LNA 56 preferably amplifies the signal with minimal noise input to the signal due to the location of the LNA 56 near the input end 40 of the repeater path 38.

As shown in FIG. 2, the repeater path 38 may further include a downlink converter 58 ("DC") for converting the signal frequency from an uplink frequency 136 (e.g., 11,000 GHz, FIGS. 3-4) to a downlink frequency 138 (e.g., 12,000 GHz, FIGS. 3-4) prior to transmission of the signal by the repeater transmitting antenna. An input multiplexer 60 ("IMUX") may be included in the repeater path 38 to separate the signal bandwidth 140 (FIGS. 3-4) into different channels prior to amplification of each channel by one or more amplifiers such as a high power amplifier 64 ("HPA") (FIGS. 3-4).

FIG. 2 illustrates additional repeater components 46 including, but not limited to, a dynamic link assignment ("DLA") device 62 that may also be included between the IMUX 60 and a travelling wave tube 64 ("TWT") amplifier. In an embodiment, the HPA (FIGS. 3-4) may comprise one or more of the TWT 46 amplifiers although other HPA configurations are contemplated. The TWT 46 amplifier may be communicatively coupled to an output multiplexer 66 ("OMUX") for re-combining the channels at the downlink frequency 138 (FIGS. 3-4) prior to delivery to the repeater transmitting antenna. As indicated earlier, the repeater path 38 (FIG. 2) may include the output test coupler 68 on the output end 42 for testing the repeater path 38 prior to placing the repeater 36 (FIG. 1) into service. It should be noted that the above-described embodiment of the repeater path 38 is an example of one of a relatively wide variety of repeater path 38 configurations that may be designed, developed and evaluated using the evaluation system 100 and method disclosed herein.

Referring to FIG. 3, shown is an embodiment of a system manager 102 configured to receive parameters of the repeater components 46 that make up the repeater path 38. The system manager 102 may be configured to facilitate entry of the component performance parameters 110 such as by a user of the evaluation system 100 (FIG. 3). The identification and loading of the component performance parameters 110 into the system manager 102 may facilitate the design, evaluation and/or validation of the performance of the repeater path 38 as described below. In addition, the system manager 102 in FIG. 3 may facilitate the entry of parameters 228 (FIG. 4) of the transmitting earth station 26 (FIG. 1) and receiving earth station 30 (FIG. 1). As indicated above, non-limiting examples of component performance parameters 110 of the repeater components 46 that may be entered or received within the system manager 102 may include the gain 116, loss 112, noise figure 118, and noise temperature 114 of one or more of the components 46 in a given system configuration 158 of a repeater path 38 and may likewise include parameters 228, 230 of the transmitting earth station 26 and receiving earth station 30.

Referring to FIG. 3, the system manager 102 may facilitate entry of the individual losses 112 of each one of the components 46 at each stage 108 in the repeater path 38. A stage 108 may be defined as the location of a repeater component 46 in the repeater path 38. FIG. 3 illustrates a stage 108 identified as "Loss 2" wherein components 46 are listed and which may be associated with a given repeater component 46. For example, at the stage 108 identified as "Loss 2", the repeater components 46 may include the TRF 54 and various connectors, switches and other and miscellaneous items that may be associated with the TRF 54. The individual losses 112 of each repeater component 46 may be obtained such as from a manufacturer and may be entered into the system manager 102 such as by a user of the evaluation system 100. For example, stage 108 may include the stage identified as "Loss 2" and which list indicates that the transmit reject filter 54 has a loss 112 of 0.15 dB.

Although not listed in FIG. 3, the losses 112, gains 116 and noise figures 118 entered into the system manager 102 may be expressed in terms of dB or in any other suitable units. The total of the losses 112 associated with a given repeater component 46 at a stage 108 may also be included in the system manager 102. For example, for the stage 108 identified as "Loss 2", the total loss 112 is indicated as 0.56 which may be expressed in dB. In addition, a noise temperature 114 may be associated with each repeater component 46 and which may also be identified and entered into the system manager 102 illustrated in FIG. 3. The noise temperature 114 represents the temperature associated with a given loss magnitude. An increase in noise temperature 114 may generally correlate to an increase in loss in a component. For example, FIG. 3 illustrates a noise temperature of 290.00 (K) associated with the loss of 0.56 for the stage 108 indicated as "Loss 2." An increase in noise temperature 114 from 290.00 K may result in an increase in the loss above the 0.56 dB loss indicated for the stage identified as "Loss 2."

FIG. 3 illustrates a repeater component 46 identified as the LNA 56 (i.e., low noise amplifier) described above with regard to the repeater path 38 of FIG. 2. In the system manager 102 of FIG. 3, a gain 116 and an associated noise figure 118 may be entered for the LNA 56 and for additional repeater components 46. For example, the gain of 39.50 dB and a noise figure of 1.50 dB may be entered into the system manager 102 for the LNA 56. Additional hardware may be associated with the LNA 56 and which may have losses that may contribute to the total loss at a stage 108 of the repeater path 38. For example, the stage 108 identified as "Loss 3" may include a "Coax Pad" having a loss of 0.50 dB and a descriptively-named microwave "T-switch" having a loss of 0.40 dB. The T-switch may have a general "T" shape and may include three ports comprising two input ports and one output port and enabling selection of one of two input signals to pass through the output port.

The losses 112 of the hardware associated with the LNA 56 may be entered into the system manager 102 as may a noise temperature 114 that may be associated with the losses indicated for each stage 108. The total loss at each stage 108 may be calculated. For example, the stage 108 identified as "Loss 3" is indicated as having a total loss of 7.84 dB. In this same manner, all of the component performance parameters 110 such as loss 112, noise temperature 114, gain 116 and noise figure 118 may be identified for the component parameters 47 and received within the system manager 102 for a given configuration of a repeater path 38.

Referring still to FIG. 3, parameters of the repeater receiving antenna 44 (FIG. 4) may also be entered into the system manager 102. For example, the repeater receiving antenna noise temperature 122 may be entered into the system manager 102 in units of Kelvin or in any other suitable units. The antenna noise temperature 122 may be associated with noise from the Earth 14 (FIG. 1) and from space and may be a function of the frequency of the uplink signal 20 (FIG. 1) received by the repeater receiving antenna 44. In addition, the antenna noise temperature 122 may affect the gain of the repeater receiving antenna 44. The system manager 102 may facilitate the entry of parameters such as noise temperature 122, gain 124 and miscellaneous losses 126 associated with the repeater receiving antenna 44. Such miscellaneous losses 126 may comprise losses due to manufacturing defects of the repeater receiving antenna 44

FIG. 3 further illustrates the system manager 102 configuration adapted to receive additional repeater parameters in addition to gain 116, loss 112 and noises 114, 118. For example, a value for the HPA amplifier rating 128 may be entered into the system manager 102 and may represent the maximum power level of the HPA 64 before saturation. The repeater transmitting antenna gain 130 for the downlink may also be entered as may other parameters. The system manager 102 may include a list of locations of the transmitting and/or receiving earth station 26, 30 (FIG. 1) that may be selected using a location selector 132 (FIG. 4). The selection of the receiving earth station 30 locations may affect the predicted repeater performance 208 (FIG. 4) such as predicted downlink EIRP 304 associated with the receiving earth station 30 location as described in greater detail with regard to FIG. 4.

Additional earth station parameters that may be received into the system manager 102 illustrated in FIG. 3 include the uplink signal frequency 136, downlink signal frequency 138, signal bandwidth 140 and signal data rate 142. Parameters associated with the transmitting earth station antenna 28 (FIG. 4) such as the estimated uplink EIRP 146 and the range 148 or distance of the on-orbit spacecraft 34 (FIG. 4) from the transmitting earth station 26 (FIG. 4) may also be entered into the system manager 102 of FIG. 3. In addition, noise performance of the transmitting earth station 26 may be entered in the form of the gain-to-noise-temperature ratio ("G/T") 150 of the transmitting earth station 26.

The estimated uplink and downlink atmospheric losses 154, 156 may also be identified and received within the system manager 102. The estimated uplink and downlink atmospheric losses 154, 156 are illustrated in FIG. 3 as having a null value (i.e., 0.00) which may represent a lack of atmospheric losses due to clear air and/or lack of precipitation. However, non-zero values may be entered for the estimated uplink and downlink atmospheric losses 154, 156 to account for attenuation of the uplink and downlink signals 20, 24 (FIG. 1) when passing through the Earth's atmosphere.

Referring now to FIG. 4, shown is the graphical user interface 200 of the evaluation system 100 (FIG. 3). The graphical user interface 200 may include a repeater component section 222 which may contain the same repeater components 46 as illustrated in the system manager 102 of FIG. 3. The graphical user interface 200 may include a legend section 206 which may include a means for distinguishing between types of data displayed on the graphical user interface 200. For example, the legend section 206 may include indicia for distinguishing between the parameter data loaded into the graphical user interface 200 and extracted from the system manager 102 (FIG. 3) and may also include repeater performance 208 data that may be calculated.

For purposes of the present disclosure, FIG. 4 illustrates the indicia as different cross-hatching patterns corresponding to the different types of values appearing in the graphical user interface 200. However, any suitable mechanism such as color may be used to distinguish the different types of data appearing in the graphical user interface 200. In this regard, the legend section 206 may identify input data 210, calculated data 212, calculated RF level 214, and overdrive/saturation 216, each of which may correspond to a different identifying mechanism such as indicia, color or other identifying mechanism. An exit button 220 may also be included to exit the evaluation system 100 (FIG. 3).

In the illustration of FIG. 4, input data 210 correlates to the parameters that are entered into the system manager 102 illustrated in FIG. 3 and which may be loaded into the graphical user interface 200 of FIG. 4 by selecting the repeater configuration load button 204 identified as "Load Budget." Calculated data 212 may be calculated by the evaluation system 100 (FIG. 3) to define the predicted repeater performance 208 of the repeater path 38 based upon the performance parameters 110 of the components and of the transmitting and receiving earth stations 26, 30 entered in the system manager 102 of FIG. 3. As examples of the calculated data 212, the predicted repeater performance 208 data illustrated in FIG. 4 may include the repeater power level 224 and/or noise level 226 at each stage 108 of the repeater path 38 as described above with regard to FIG. 3 and as illustrated in the repeater component section 222 of the graphical user interface 200 in FIG. 4. The predicted repeater performance 208 may also include the EIRP and G/T of the repeater path 38 and other values of the repeater performance.

FIG. 4 also illustrates a system configuration 158 (FIG. 3) selector option comprising a repeater configuration file menu 202 for selecting the repeater configuration 104 (FIG. 3) to load into the graphical user interface 200. Each repeater configuration 104 file may be defined in the system manager 102 of FIG. 3 and represents a set of component performance parameters 110 previously loaded into the system manager 102 and defining the repeater configuration 104. As indicated above, the repeater configuration 104 file represents a given set of repeater components 46 (FIG. 3) in the repeater path 38 configuration and further including transmitting earth station 26 parameters and receiving earth station 30 parameters. Upon selecting the load budget button 204, the parameters of the repeater components 46 and transmitting and receiving earth station 26, 30 (FIG. 4) parameters that were entered into the system manager 102 of FIG. 3 populate the graphical user interface 200 of FIG. 4. For example, in the repeater component section 222 of the graphical user interface 200, a parameter value of 166.00 identified in the graphical user interface 200 as the "Earth/Space Brightness T(ant) K" corresponds to the value received in the system manager 102 of FIG. 3.

As can be seen in the graphical user interface 200 of FIG. 4, each one of the parameters identified as input data 210 may include a parameter adjuster 221 to facilitate adjustment of the values of the parameter by increasing or decreasing the parameter value relative to the value initially populated into the graphical user interface 200. FIG. 4 illustrates each parameter adjuster 221 as comprising an up/down arrow for adjusting the values of the parameters. However, any suitable mechanism including drop-down menus, sliders or any other suitable means for adjusting the parameters may be employed.

Referring to the EIRP section 292 illustrated in FIG. 4, shown are predicted repeater performance 208 parameters of the repeater 36 (FIG. 1) identified in FIG. 4 by the cross-hatching pattern illustrated in the legend section 206. The predicted repeater performance 208 parameters illustrated in the EIRP section 292 of the GUI 200 are calculated as a function of the parameters received into the system manager 102 of FIG. 3. For example, parameters of downlink path loss 294, downlink atmospheric loss 156, signal bandwidth 140 and signal data rate 142 are parameters that are loaded into the GUI 200 from a given repeater path 38 defined in the system manager of FIG. 3.

The evaluation system 100 (FIG. 3) may predict and/or calculate the predicted repeater performance 208 parameters such as the predicted downlink EIRP 304 of the repeater path 38 as illustrated in the EIRP section 292 of the graphical user interface 200 (FIG. 4). Other predicted repeater performance 208 parameters that may be calculated include a conversion factor 302 indicating the amount of the HPA output power 64 (FIG. 3) and repeater losses 112 (FIG. 3) that are converted to the EIRP 304 of the repeater path 38. Also, the EIRP section 292 of the graphical user interface 200 may calculate the carrier-to-noise ratio ("C/N") 296 at the receiving earth station and representing the ratio of received carrier or signal power (represented by "C") to the received noise power (represented by "N"). In addition, the EIRP section 292 may calculate and list additional repeater performance parameters including the carrier-to-noise density ratio ("C/$N_o$") 298 wherein the carrier or signal power is represented by "C" and the noise spectral density is represented by "$N_0$". The EIRP section 292 may also list the energy-to-noise density ratio ("Eb/$N_o$") 300 and representing the ratio of energy per information bit ("$E_b$") to noise spectral density ("$N_0$") and which may provide an indication of on-orbit performance of the repeater 36 (FIG. 1).

FIG. 4 also illustrates a G/T section 276 of the graphical user interface 200 which represents the ratio of the gain of the earth station antenna to system noise temperature. The G/T section 276 of FIG. 4 illustrates a G/T value of 10.83 dBK which is calculated based upon the parameters entered into the system manager 102. The G/T section 276 may also include calculated values of the repeater noise figure 278, system temperatures 280, 282, repeater temperatures 284, 286, and a conversion factor 288. Repeater noise figure 278 (i.e., "Rptr NF") represents the noise performance of the repeater and repeater temperature 284 (i.e., "Trptr") represents the same parameter as repeater noise figure 278 but is expressed in dBK. System temperature 280 (i.e., "Tsys") is a measure of noise entering the repeater 36 (FIG. 1) and system temperature 282 ("Tsys") is the same parameter expressed in dBK. Conversion factor 288 is a figure of merit representing the proportion of antenna losses and other losses that contribute to the overall G/T of the repeater 36.

FIG. 4 further illustrates a ground station section 232 comprising the transmitting and receiving earth station parameters 228, 230 received in the system manager 102 (FIG. 3) and loaded into the graphical user interface 200 of FIG. 4. As can be seen in FIG. 4, the ground station section 232 may include the estimated uplink EIRP 146, range, uplink and downlink signal frequency 136, 138, earth station G/T ratio 150, estimated uplink atmospheric loss 154, and earth station downlink antenna gain 152. As can be seen in the ground station section 232, such values may be user-entered into the system manager 102 of FIG. 13 and may be included in the calculation or prediction of the performance parameters of uplink path loss 236, uplink carrier-to-noise density ratio ("C/$N_o$") 238, and received downlink power 240.

The ground station section 232 may facilitate the ability of a user in selectively increasing or decreasing the earth station parameters 144 to evaluate the effect on repeater performance. For example, the ground station section 232 of the graphical user interface 200 in FIG. 4 may include one or more saturation level selection 234 buttons wherein the value of the estimated uplink EIRP 146, typically estimated by an operator of the transmitting earth station 26, may be manipulated by the user as a means to evaluate the response of the repeater 36 (FIG. 1). For example, selection of one of the saturation level selection 234 buttons may facilitate an increase in the estimated uplink EIRP by 5 dB to determine whether the increase results in saturation of the repeater path 38 (i.e., spacecraft 34 (FIG. 1)) which could potentially be harmful to a physical model of the repeater 36. Likewise, selection of one of the saturation level selection 234 buttons may facilitate a decrease in the estimated uplink EIRP 146 by −10 dB to evaluate the effect on repeater performance.

Also illustrated in FIG. 4 is a test equipment set up section 250 wherein a physical model of the repeater path 38 may be ground-tested and validated prior to entry into service. As described in greater detail below, the test equipment set up section 250 may include one or more of the calculated parameters representing predicted repeater performance of the repeater path 38. For example, the calculated repeater power input 258 indicated in the equipment set up section 250 of FIG. 4 with a value of −68.76 dBm corresponds to the repeater input power level at the input end 40 of the repeater 36 as shown in the repeater components section 222. The repeater power input 258 may correspond to a test RF signal 260 that may be provided to the repeater 36 (FIG. 1) by a synthesizer 251 during ground testing. The test RF signal 260 may have a magnitude accounting for test equipment losses during validation of the repeater path 38. Likewise, the calculated repeater power output level 270 is identified in FIG. 4 as spacecraft out ("S/C Out") 245 in the test equipment set up section 250 and illustrated as having a value of 48.50 dBm which corresponds to the cumulative power level 224 of the repeater path (e.g., 50.79 dBm in FIG. 4) at the output end 42 minus the cumulative noise figure 226 (e.g., 2.29 dB in FIG. 4) at the output end 42.

The test equipment set up section 250 illustrated in FIG. 4 may facilitate validation of a physical model of the repeater path 38 such as by a test engineer. In this regard, a user such as a test engineer may adjust values in the test equipment set up section 250 prior to applying a synthesized RF signal to the repeater path 38 to simulate the signal that the repeater path 38 is configured to receive via the repeater receiving antenna 44. For example, in the test equipment set up section 250 illustrated in FIG. 4, a user may adjust the losses in the connections between test equipment and the repeater 36 (FIG. 1) such as the cable loss 254 indicated in FIG. 4. In this regard, the test equipment set up section 250 may allow a user to adjust the losses in the connection between the physical model of the repeater 36 and an uplink power meter 264 and coupler losses 266 to a downlink power meter 272.

Losses in the coupling 254 between a synthesizer, a separate device which may not be linked to the evaluation system 100, and the test equipment may also be adjusted by a user and may be identified in the test equipment set up section 250 as special test equipment loss indicated by ("STE Loss") 254 and representing losses in the special test equipment ("STE"). In addition, a maximum output 252 of the synthesizer may be adjusted by a user by manipulating the parameter adjuster 221 for the maximum output 252 illustrated in FIG. 4. The maximum output 252 of the synthesizer may alert a user by visual (e.g., changing color) means corresponding to the color or indicia noted in the legend section in the window "overdrive/ saturation" 218. However, a user may be alerted to a maximum output 252 of the synthesizer by any other suitable means including audible (e.g., beeping, etc.) means to indicate that the power 251 output of the synthesizer is at a maximum. Also included may be an indicator of the required synthesizer power 251 necessary to generate the test RF signal 260 at a power level corresponding to the calculated repeater power input 258 (i.e., −68.76 dBm in FIG. 4). Referring still to the test equipment set up section 250 of FIG. 4, a calculated uplink cable loss ("UL Cal") 268 may be included indicating calculated losses in the connection from the uplink power meter 264 to the test equipment. Likewise, a user may enter downlink losses 274 in the connection between a downlink power meter 272 and the test equipment.

In regard to the power level of the test RF signal 260 (FIG. 4) that may be applied to the repeater path 38 (FIG. 4), the test equipment set up section 250 (FIG. 4) may facilitate user entry of an overdrive limit 262 (FIG. 4). The overdrive limit 262 may include means for alerting a user of excessive power input to the repeater 36 that may harm the repeater components 46 (FIG. 3). For example, upon nearing the user-set value, the overdrive limit 262 may change color or provide other suitable means by which the user may be notified of the level of power provided to the repeater 36 (FIG. 1). In each of the above-identified parameters entered by a user in the system manager 102 of FIG. 3 and loaded into the GUI 200 of FIG. 4, the values of the parameters 110, 228, 230 may be adjusted by means of manipulating the parameter adjuster 221 mechanisms described above and illustrated in FIG. 4 for each one of the parameters. The parameter adjuster 221 mechanisms facilitate adjustment of the parameters and provide a means to determine the effect of changes in the parameters on predicted repeater performance 208 of the repeater path 38.

A saturation level section 242 (FIG. 4) may be included with the graphical user interface 200 to provide a means to gauge or monitor the level of power provided to the repeater path 38. For example, a high power amplifier output power ("HPA output power (Watts)") 244 (FIG. 4) may be included to provide a means to gauge or monitor the output power of the TWT 64 high power amplifier illustrated in the repeater components 46 section of the graphical user interface 200 of FIG. 4. The calculated HPA output power 244 (FIG. 4) is associated with the calculated repeater input power level 246 (FIG. 4) (i.e., −68.76 dBm) and the adjustable HPA amplifier rating 128 (FIG. 3) in the repeater components 46 section. The saturation level section 242 may further include a calculated relative saturation 248 (FIG. 4) value to indicate the input power level applied to the repeater path 38 relative to the saturation point of the TWT 64.

As can be seen in the example of FIG. 4, the calculated relative saturation 248 is shown in FIG. 4 as having a value of 0.00 which indicates that the HPA (i.e., TWT 64) is saturated and requires backoff of the input power applied to the repeater 36 (FIG. 1). Preferably, the calculated relative saturation 248 indicates a value of approximately −1.0 indicating that an increase of input power by approximately 1 dBm will result in saturation of the HPA and generally indicating that the repeater 36 is operating near maximum efficiency. However, as described in greater detail below, the component performance parameters 110 (FIG. 3) may be adjusted using the graphical user interface 200 (FIG. 4) such that the repeater input power level results in a relative saturation of no greater than 0.0 dBW and no less than approximately −5.0 dBW, and more preferably, a relative saturation of between approximately 0.0 dBW and −2.0 dBW.

Figure 5:
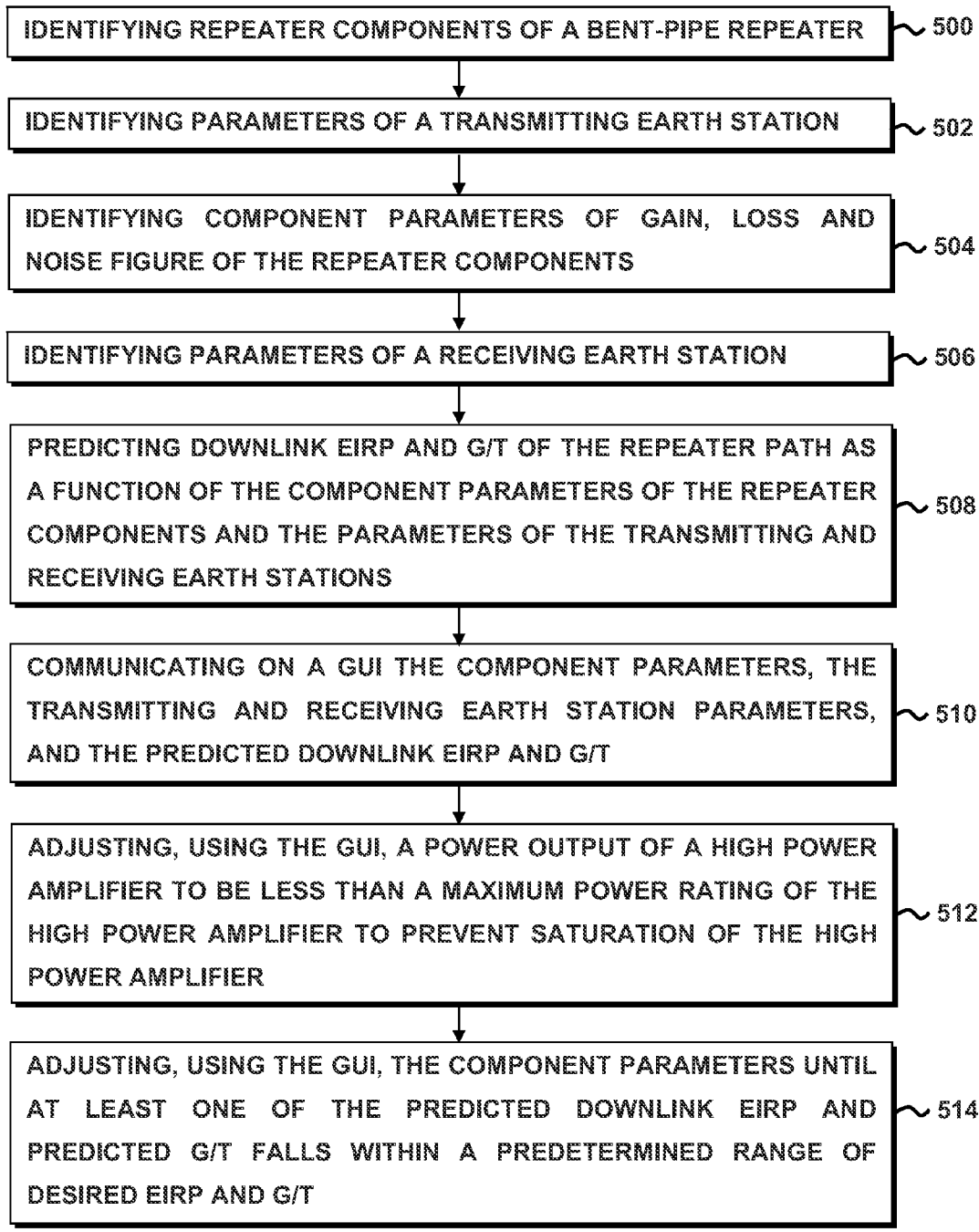
FIG. 5 is an illustration of an embodiment of one or more operations that may be included in a methodology of evaluating the repeater path.

Referring to FIG. 5, the operation of the evaluation system 100 will now be described. FIG. 5 illustrates an embodiment of a methodology of evaluating a repeater path 38 (FIG. 4). The methodology may include one or more of the operations illustrated in FIG. 5 and which may facilitate the design and evaluation of a repeater path 38 such as the bent-pipe repeater path 38 similar to that which is illustrated in FIGS. 2-4. In an embodiment, Step 500 of the methodology may comprise providing the repeater components 46 that make up the repeater path 38. As illustrated in FIGS. 2-4, the repeater path 38 may include an input end 40 and an output end 42. The repeater components 46 may include a test coupler 48, 68 at the input end 40 and output end 42 of the repeater path 38 to facilitate the evaluation of a physical model of the repeater path 38.

In addition, the repeater path 38 may include a repeater receiving antenna 44 (FIG. 4) that may be coupled to the input end 40 of the repeater path 38 and which may receive uplink signals 20 (FIG. 1) transmitted by the transmitting earth station antenna 28 (FIG. 4). The repeater path 38 may further include the repeater components 46 (FIG. 2) including, but not limited to, a low noise amplifier 56, a frequency converter 58, input and output multiplexers 60, 66, a channel control unit, and a high power amplifier (HPA) such as a travelling wave tube 64 (TWT) amplifier and associated waveguides 50, cables 52, and connectors, switches and other miscellaneous hardware. Each one of the repeater components 46 may have a given set of operating characteristics that may be published or advertised by a manufacturer. For example, a repeater component 46 may be identified by a given loss 112 and associated noise temperature 114 (FIG. 3). Likewise, a repeater component 46 such as an amplifier may be identified by a given gain 116 and associated noise figure 118 (FIG. 3).

Although a manufacturer may advertise identical specifications and operating parameters such as gain 116, loss 112 (FIG. 3) and noise figure 118 for a given component configuration, differences in assembly and materials may results in differences in the performance of identical components. In this regard, the evaluation system 100 (FIG. 3) as disclosed herein provides a means to evaluate the differences in performance in the repeater components 46 and the effects thereof on the overall performance of the repeater path 38. In addition, the evaluation system 100 provides a means to adjust the component performance parameters 110 during the design and development of the repeater 36 (FIG. 1) to investigate response of the repeater path configuration to different operating conditions and noise environments.

Step 502 of the methodology of FIG. 5 may comprise identifying and/or receiving parameters 228 (FIG. 4) of the transmitting earth station 26 (FIG. 4). For example, such parameters may include an estimated uplink EIRP 146 of the transmitting earth station antenna 28 as illustrated in the graphical user interface 200 in the ground station section 232. Additional parameters 228 of the transmitting earth station 26 may include range 148 or distance from the transmitting earth station 26 to the on-orbit satellite repeater 36, uplink and downlink signal frequency 136, 138, earth station G/T ratio 150, estimated uplink atmospheric loss 154, and earth station downlink antenna gain 152 which may be included in predicting and/or calculating the performance parameters of uplink path loss 236, and received downlink power 240 (FIG. 4). The parameters of the earth stations may be user-entered in the system manager 102 illustrated in FIG. 3 as indicated above.

Step 504 of the methodology of FIG. 5 may comprise identifying and/or receiving component performance parameters 110 (FIG. 3) of repeater components 46 in the repeater path 38. For example, such component performance parameters 110 may comprise gain 116, loss 112, noise figure 118 and noise temperature 114 of the components 46. FIG. 3 illustrates user-entry of the components in the system manager 102. As indicated above, a set of repeater components 46 for a given repeater configuration 104 may be identified by a repeater configuration 104 filename. For example, FIG. 3 illustrates a system configuration 158 having the filename "Ku Band India" indicating that the configuration of repeater components 46 entered into the system manager 102 of FIG. 3 may be associated with a communications satellite providing coverage to at least a portion of the Indian continent. In this manner, the system manager 102 provides a means for defining and storing an infinite variety of repeater configuration 104 files that may be recalled and loaded into the graphical user interface 200 of FIG. 4 and thereafter adjusted to ascertain the impact of changes to the parameter values on the predicted repeater performance 208 of the repeater path 38.

Step 506 of FIG. 5 may comprise identifying and/or receiving parameters of the receiving earth station 30 (FIG. 4) in a manner similar to that which was described above for the transmitting earth station 26. Once obtained, such parameters may be entered such as by a user into the system manager 102 illustrated in FIG. 3. Examples of the receiving earth station 30 parameters include the downlink frequency 138 and the downlink antenna gain 152 which may be user-entered as illustrated in the system manager 102 of FIG. 3 and which are illustrated in FIG. 4 in the section entitled ground station 232.

Step 508 of the methodology of FIG. 5 may comprise predicting and/or calculating the predicted repeater performance 208 (FIG. 4) of the repeater path 38 (FIG. 4) by initially selecting a repeater configuration 104 file (FIG. 3) entered into the system manager 102 (FIG. 3) and which may be saved for later recall. In the graphical user interface 200 of FIG. 4, selection of the load budget button 204 facilitates user selection of one of the saved repeater configuration 104 files. The load budget button 204 may comprise any suitable means for selecting a repeater configuration 104 (FIG. 3) defined with the system manager 102 of FIG. 3. For example, FIG. 4 may include a drop down menu for selecting a repeater configuration 104 file from the load budget button 204. The repeater configuration load button 204 in FIG. 4 may be selected causing the parameters entered in the system manager 102 of FIG. 3 to populate the graphical user interface 200 of FIG. 4.

Step 510 may comprise communicating or displaying on the graphical user interface 200, the transmitting and receiving earth station parameters 228, 230 (FIG. 4), and/or the predicted repeater performance 208 parameters of the repeater path 38 (FIG. 4) such as the predicted downlink EIRP 304 (FIG. 4) and/or the predicted G/T 290 (FIG. 4) of the repeater path 38. In this regard, upon loading of the user-defined parameters into the graphical user interface 200, the calculated data 212 and the calculated RF levels 214 may be determined and displayed in the graphical user interface 200. As indicated above, the calculated data 212 and the calculated RF levels 214 provide an indication of the predicted repeater performance 208 of the repeater path 38 for the selected repeater configuration 104 (FIG. 3).

Step 512 of FIG. 5 may comprise adjusting, using the graphical user interface 200 (FIG. 4), a power output of a high power amplifier (e.g., TWT 64) in the repeater path 38 to be less than a maximum power rating to prevent saturation of the high power amplifier. In this regard, the parameter adjuster 221 (FIG. 4) of the HPA amplifier rating 128 (FIG. 4) may be manipulated to increase or decrease the maximum power output of the TWT 64 (i.e., the high power amplifier—HPA) which may alter the power level at which the HPA may become saturated. By increasing the maximum power that may be applied to the HPA, the predicted repeater performance 208 (FIG. 4) of the repeater path 38 may be altered. For example, it may be desired to provide the receiving earth station 30 with a downlink EIRP of 50 dBW. The component performance parameters 110 (FIG. 3) populating the graphical user interface 200 (FIG. 4) may limit the downlink EIRP to less than 45 dBW despite adjustments to the component performance parameters 110. However, the maximum power output of the HPA may be increased by adjusting the HPA amplifier rating 128 (FIG. 3) in the repeater components section 222 (FIG. 4). Re-calculation of the predicted repeater performance 208 parameters upon increasing the HPA amplifier rating 128 may result in an increase in the downlink EIRP to 50 dBW.

Step 514 in FIG. 5 may further comprise adjusting, using the graphical user interface 200, at least one of the component performance parameters 110 (FIG. 3) values. For example, the parameter adjuster 221 (FIG. 4) may be manipulated to cause an increase in any one of the gain 116, loss 112, noise figure 118, and/or noise temperature 114 (FIG. 3) of one or more of the component performance parameters 46 to determine the effect on the repeater performance. In an embodiment, the component performance parameters 110 may be manipulated such that the predicted repeater performance 208 (FIG. 4) falls within a predetermined range of desired repeater performance. For example, FIG. 3 illustrates a component parameter value of 166.00 K for the repeater receiving antenna noise temperature 122 which is identified in the graphical user interface 200 as the "Earth/Space Brightness T(ant) K" and which was entered in the system manager 102 of FIG. 3. The parameter adjuster 221 for the receiver antenna noise temperature 122 (FIG. 4) may be manipulated to increase or decrease the value of 166.00 K by activating the up/down arrow located on a side of the window or by other suitable parameter adjuster 221 means.

Upon adjusting the parameters, the evaluation system 100 (FIG. 3) may recalculate in real-time the predicted repeater performance 208 (FIG. 4) of the repeater path 38 which may be observed or otherwise communicated via the graphical user interface 200 (FIG. 4). For example, a change in the receiver antenna noise temperature 122 (FIG. 3) may result in a decrease in the predicted downlink EIRP 304 (FIG. 4) and which may be reflected in the EIRP section 292 (FIG. 4) of the graphical user interface 200. Likewise, the predicted downlink G/T 290 of the repeater path 38 may be updated in the G/T section 276 in response to adjustment of the receiver antenna noise temperature 122.

In another example, the power output level of the TWT 64 amplifier may be adjusted using the parameter adjuster 221 for the HPA amplifier rating 128 (FIG. 4). The gain of the LNA 56 may be adjusted to attain the desired repeater performance while maintaining the TWT 64 (i.e., the HPA) below the maximum power rating by manipulating the parameter adjusters 221. In addition, a parameter adjuster 221 may be manipulated to minimize the noise figure 118 of the LNA 56 in a manner to maximize the predicted downlink EIRP 304 (FIG. 4) and/or the predicted G/T 290 (FIG. 4) of the repeater 36. In this regard, the evaluation system 100 may be configured such that any adjustment of any of the component performance parameters 110 and/or transmitting and receiving earth station parameters 228, 230 populating the graphical user interface 200 may result in a change in the predicted repeater performance 208 (e.g., downlink EIRP 304, G/T 290). The parameters may be managed and adjusted until the predicted downlink EIRP 304 and/or predicted downlink G/T 290 fall within respective predetermined ranges of a desired EIRP and desired G/T. Each time the parameters are displayed and/or recalculated on the graphical user interface 200, the parameters may be saved as a file for recall or later use.

Figure 6:
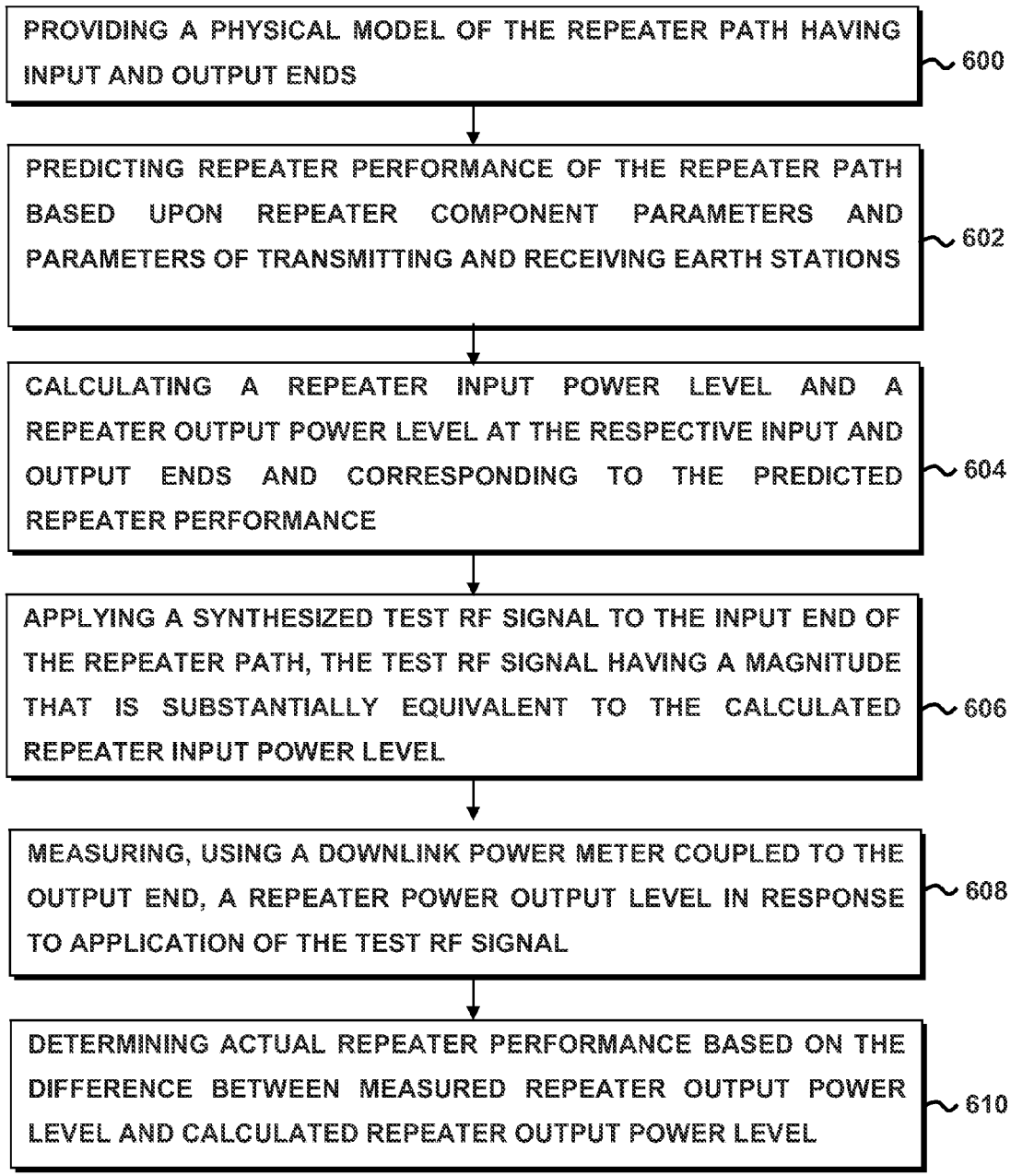
FIG. 6 is an illustration of an embodiment of one or more operations that may be included in a methodology of determining the performance of a physical model of the repeater path.

Referring to FIG. 6, shown is an embodiment of a methodology including one or more operations for ground testing a physical model of the repeater path such as a bent-pipe repeater of a spacecraft 34 (FIG. 1). The repeater path 38 (FIG. 4) may include repeater components 46 (FIG. 3) similar to those for which the repeater performance is predicted in the methodology of FIG. 5 using the evaluation system illustrated in FIGS. 3 and 4. The methodology of FIG. 6 may comprise Step 600 of providing a physical model of the repeater path 38 (FIG. 4) having input and output ends 40, 42. As illustrated in FIG. 4, the repeater path 38 may include a test coupler at the input end 40 and at the output end 42 to facilitate the validation of the physical model of the repeater path 38 during ground testing.

Step 602 of the methodology of FIG. 6 may include predicting and/or calculating, using the GUI 200, the predicted repeater performance such as predicted downlink EIRP and predicted G/T in a manner similar to that described above in the methodology illustrated in FIG. 5. As indicated above, the predicted repeater performance is based upon the component performance parameters 46 and the parameters of the transmitting earth station 26 and the receiving earth stations 30 illustrated in FIG. 4.

Step 604 of the methodology of FIG. 6 may comprise predicting and/or calculating the repeater input power level 246 (FIG. 4) and the repeater output power level 245 (FIG. 4) at the respective input and output ends 40, 42 of the repeater path 38 (FIG. 4). As indicated above, FIG. 4 illustrates the test equipment set up section 250 wherein the physical model of the repeater path 38 may be ground-tested and validated prior to entry into service. As indicated above, the test equipment set up section 250 of the GUI 200 may include calculated parameters corresponding to predicted repeater performance of the repeater path 38 such as the calculated repeater power input 258 indicated as −68.76 dBm indicated in the equipment set up section 250 of FIG. 4. The −68.76 dBm value indicated in the equipment set up section 250 corresponds to the repeater input power level 246 at the input end 40 of the repeater 36 (FIG. 1) as indicated in the repeater components section 222 of the GUI 200 (FIG. 4).

The methodology of FIG. 6 may include adjusting the variables in the test equipment set up section 250 (FIG. 4) of the GUI 200 to account for losses in the connection of the test equipment to the physical model of the repeater 36. For example, a user such as a test engineer may adjust the test equipment set up section 250 to account for losses in the connection between the uplink power meter 264 (FIG. 4) and the physical model of the repeater path 38 (FIG. 4). Likewise, a test engineer may adjust the GUI 200 for coupler losses 266 (FIG. 4) between the physical model of the repeater path 38 and a downlink power meter 272 (FIG. 4). The test engineer may also adjust losses in the coupling 254 (FIG. 4) between a separately-provided synthesizer and the test equipment as identified in the test equipment set up section 250 by the indicator "STE Loss". In addition, adjustments may be made to the maximum output 252 of the test signal synthesizer by manipulating the parameter adjuster 221 for the maximum output 252 illustrated in FIG. 4.

Step 606 of the methodology of FIG. 6 may comprise applying the synthesized test RF signal 260 (FIG. 4) to the input end 40 of the repeater path 38 (FIG. 4). As indicated above, the test RF signal 260 preferably has a magnitude that is substantially equivalent to or is representative of the calculated repeater input power level 246. In this regard, the test engineer may couple an uplink power meter to the input end 40 of the physical model of the repeater path 38 to monitor the application of the test RF signal 260 to the input end 40. The test engineer may adjust the test RF signal 260 to maintain the magnitude of the test RF signal 260 to be substantially equivalent to the calculated repeater input power level 246.

Step 608 of the methodology may comprise measuring, using the downlink power meter 272, the repeater power output level at the output end 42 (FIG. 3) of the repeater path 38 in response to the application of the test RF signal 260 to the input end 40. As described above, the test RF signal 260 is amplified and attenuated by the gains 116 and losses 112 (FIG. 3) associated with the various components 110 that make up the repeater path 38 (FIG. 4).

Step 610 of the methodology of FIG. 6 comprises determining the actual repeater performance of the physical model of the repeater path 38 (FIG. 4) based on the difference between the measured repeater output power level 245 (FIG. 4) at the output end 42 (FIG. 3) and the calculated repeater output power level 245. The measured or actual repeater output power level 245 may be measured by the downlink power meter and compared to the calculated repeater output power level 245. The calculated repeater output power level 245 may be identified in the test equipment set up section 250 in FIG. 4 as spacecraft out ("S/C Out") as defined above and indicated as having a value of 48.50 dBm which corresponds to the cumulative power level 224 of the repeater path (e.g., 50.79 dBm in FIG. 4) minus the cumulative noise figure 226 of the repeater path (e.g., 2.29 dB in FIG. 4).

If the difference between the measured repeater output power level at the output end 42 (FIG. 3) and the calculated repeater output power level 245 (FIG. 4) falls outside of a predetermined tolerance or range, the method may optionally include identifying the repeater component 46 (FIG. 3) contributing to the out-of-tolerance condition by sequentially adjusting the component performance parameters 110 (FIG. 3) until the measured repeater output power level falls within the predetermined range of the calculated repeater output power level 245. For example, a test engineer may manipulate the parameter adjuster 221 (FIG. 4) of each one of the component performance parameters 110 in the repeater components section 222 of the GUI 200 (FIG. 4) to adjust the gain 116, loss 112, noise figure 118, and/or noise temperature 114 (FIG. 3) of the component performance parameters 46 to analyze the effect on the measured repeater output power level.

Figure 7:
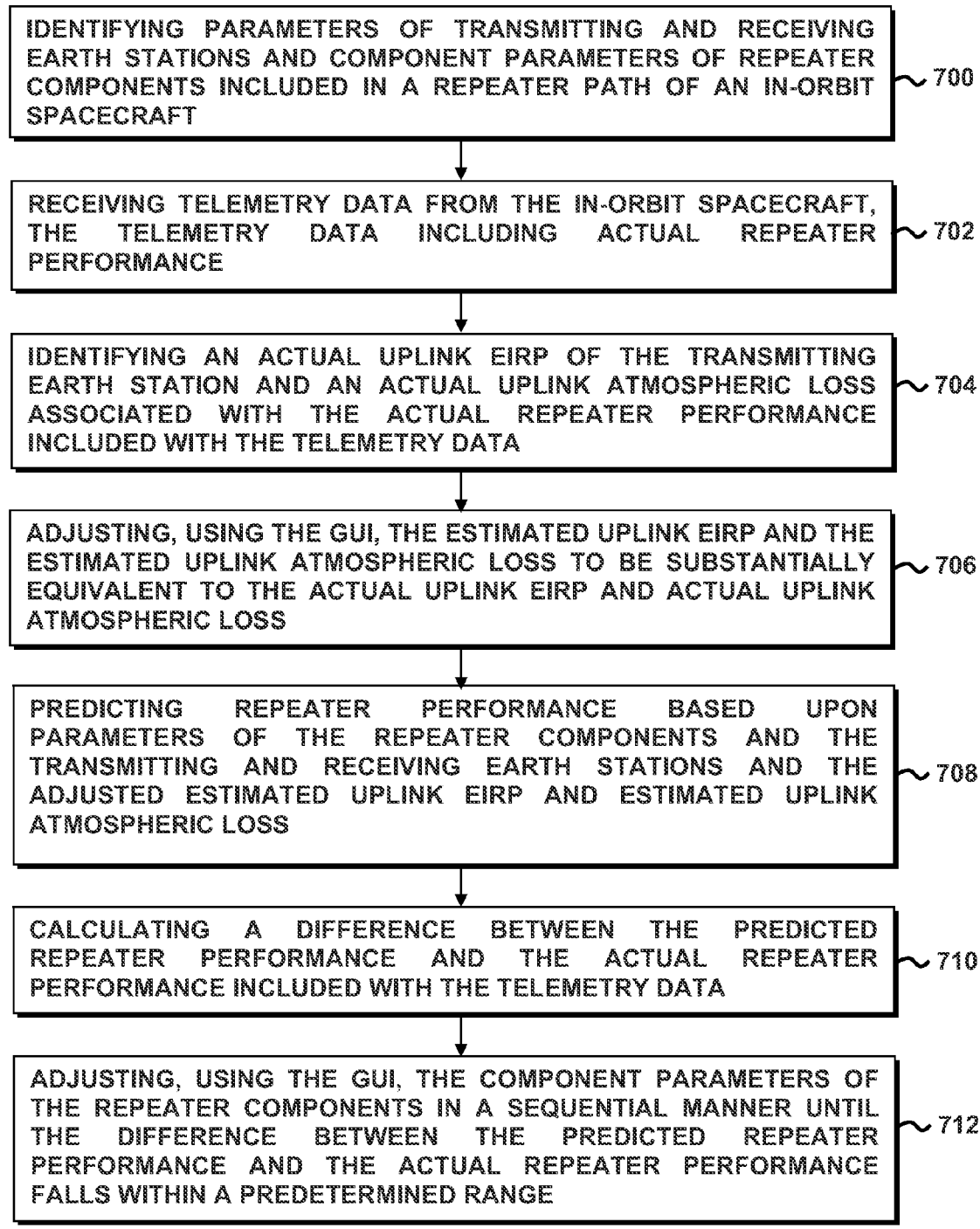
FIG. 7 is an illustration of an embodiment of one or more operations that may be included in a methodology of evaluating the performance of an on-orbit repeater.

Referring to FIG. 7, in a further embodiment, illustrated are one or more operations of a methodology for evaluating the performance of a repeater 36 (FIG. 1) that has been placed in service. In a non-limiting embodiment, the methodology may be applied for monitoring or trouble-shooting a bent-pipe repeater path 38 of an on-orbit repeater spacecraft 34 (FIG. 1). The method of FIG. 7 may comprise Step 700 of identifying and/or loading into the GUI 200 of FIG. 4 the parameters of the transmitting earth station 26, receiving earth station 30, and the repeater components 46 that make up the repeater path 38 in a manner as was described above in the methodology of FIG. 5. The component performance parameters 110 (FIG. 3) may include the gain 116, loss 112, noise figure 118, and/or noise temperature 114 of the repeater components 46 as illustrated in the repeater components section 222 of the GUI 200 of FIG. 4.

Referring still to FIG. 7, the methodology may comprise Step 702 of receiving telemetry data 25 (FIG. 4) from the on-orbit spacecraft 34 (FIG. 1) carrying the repeater 36 (FIG. 1). The telemetry data 25 may include actual repeater performance data of the repeater path 38 (FIG. 4). Step 704 may comprise identifying and/or receiving an actual or current uplink EIRP of the transmitting earth station 26 (FIG. 4) and an actual uplink atmospheric loss. The actual or currently-measured uplink EIRP and the currently-measured atmospheric loss in the uplink path 18 (FIG. 1) may be obtained from the operator of the transmitting earth station 26 at approximately the time of the evaluation of the on-orbit repeater 36.

Step 706 may comprise adjusting the estimated uplink EIRP 146 and the estimated uplink atmospheric loss 154 (FIG. 4) using the parameter adjuster 221 of the GUI 200 (FIG. 4) such that the estimated uplink EIRP 146 and estimated uplink atmospheric loss 154 (FIG. 4) are substantially equivalent to the current or actual uplink EIRP and actual uplink atmospheric loss which may be provided by the operator of the operator of the transmitting earth station 26 (FIG. 1) at approximately the time of the evaluation of the on-orbit repeater 36. As can be seen in FIG. 4, the ground station section 232 may include the estimated uplink EIRP 146 which may be adjusted by a user as may the estimated uplink atmospheric loss 154.

Step 708 may comprise calculating the predicted repeater performance of the on-orbit repeater path based upon the adjusted estimated uplink EIRP and estimated uplink atmospheric loss. For example, the GUI 200 (FIG. 4) may display the predicted downlink EIRP in the EIRP section 292 (FIG. 4) of the graphical user interface 200 based on the adjusted estimated uplink EIRP and estimated uplink atmospheric loss. Likewise, the GUI may display the predicted G/T 290 of the repeater path in the G/T section of the graphical user interface 200 illustrated in FIG. 4.

Step 710 of the methodology may comprise calculating a difference between the predicted repeater performance and the actual repeater performance included with the telemetry data 25 (FIG. 4). For example, the difference between the downlink EIRP 146 estimated during the development of the repeater path 38 (FIG. 4) and the actual downlink EIRP for the on-orbit repeater path 38 may provide an indication of the performance of the in-service repeater 36 (FIG. 1).

Figure 8:
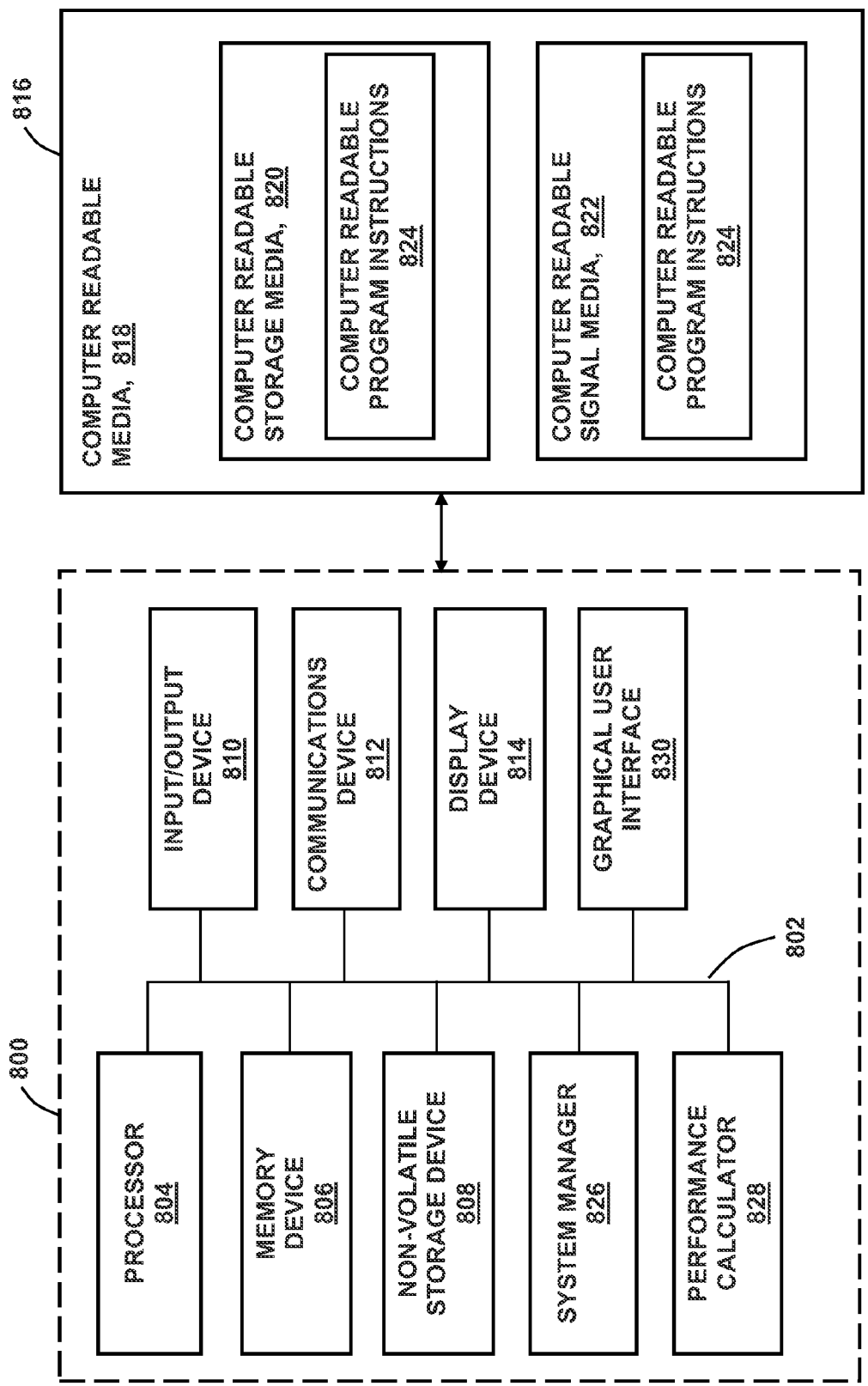
FIG. 8 is a block diagram of an embodiment of a repeater path evaluation system for implementing one or more operations of a methodology for predicting repeater performance of the repeater path.

Referring to FIG. 8, the above-described steps of the disclosed methodologies or any combination of the steps, in whole or in part, may be implemented in a computer-implemented process such as on a repeater path evaluation system 800 or other suitable computer system. The repeater path evaluation system 800 may perform computable readable program instructions 824. The computable readable program instructions 824 may be provided to or loaded onto the repeater path evaluation system 800 in order to implement one or more of the above-described operations or steps.

In a non-limiting example, the repeater path evaluation system 800 and/or the computable readable program instructions 824 may facilitate the evaluation of the repeater path 38 (FIG. 4) such as a bent-pipe repeater path of a communications system 10 (FIG. 4). Although described in the context of a repeater 36 spacecraft 34 (FIG. 1) for receiving and transmitting RF signals (FIG. 1) between transmitting and receiving earth station 26, 30 (FIG. 1), the evaluation system 102 (FIGS. 3-4) as disclosed herein may be implemented for evaluating a repeater 36 (FIG. 1) as may be incorporated into any communications system including any marine, land, airborne or spaced-based communications system or any combination thereof, without limitation.

The block diagram of FIG. 8 illustrates the repeater path evaluation system 800 in an advantageous embodiment that may use the evaluation system 102 (FIGS. 3-4) for predicting repeater performance of a repeater 36 (FIG. 4) having a given set of repeater components 46 (FIG. 3) as described in greater detail above. In the embodiment illustrated in FIG. 8, the repeater path evaluation system 800 may include a data communication path 802 (e.g., data link) to communicatively couple one or more components to facilitate transfer of data between such components. The communication path 802 may comprise one or more data buses or any other suitable communication path that facilitates the transfer of data between the components and devices of the repeater path evaluation system 800.

In a non-limiting embodiment, the components of the repeater path evaluation system 800 may include one or more of a processor 804, a memory device 806, a non-volatile storage device 808, a communications device 812, an input/output device 810, a display device 814, a system manager 826, a performance calculator 828, and a graphical user interface 830. The system manager 826 may receive parameters of a transmitting earth station 26 (FIG. 4) and a receiving earth station 30 (FIG. 4) and component performance parameters 110 (FIG. 3) of repeater components 46 (FIG. 3) in the repeater path 38 (FIG. 4). The performance calculator 828 may calculate predicted repeater performance of the repeater path based upon the component performance parameters 110 and parameters of the transmitting and receiving earth stations 26, 30 (FIG. 4).

The system manager 826 may be adapted to capture a plurality of discrete parameters for one or more transmitting earth stations 26 and receiving earth stations 30 and including the component performance parameters 110 comprising at least one of gain, loss, noise figure and noise temperature of one or more repeater components in the repeater path. In this regard, the system manager 826 may receive component performance parameters 110 (FIGS. 3-4) which may be user-entered into the system manager 826 such as that which is shown in FIG. 3 using the input/output device 810. The input/output device 810 may also facilitate user-input of parameters of the transmitting earth station 26 (FIG. 4) and the receiving earth station 30 (FIG. 4) and component performance parameters 110 of the repeater components 46 (FIG. 3) by means of a peripheral device such as a keyboard, a mouse, a joystick, a touch screen and any other suitable device for inputting data into the system manager 826. Component performance parameters 110 (FIGS. 3-4) including, but not limited to, gain 116, loss 112, noise figure 118, and/or noise temperature 114 may be entered into the system manager 826. In addition, parameters associated with miscellaneous hardware such as waveguides 50, cables 52 (FIG. 2), connectors, switches and other miscellaneous hardware associated with each repeater component 46 in the repeater path 38 (FIG. 4) may also be entered into the system manager 826 and the total loss at each stage 108 in the repeater path 38 may be calculated by the system manager 826 as described above and illustrated in FIG. 3 (FIG. 3).

As indicated above, the transmitting and receiving earth station 26, 30 (FIG. 4) parameters may be entered into the system manager 826 as illustrated in FIG. 3. For example, the uplink signal frequency 136, downlink signal frequency 138, signal bandwidth 140, signal data rate 142, estimated uplink EIRP 146 and the range 148 of the on-orbit repeater spacecraft 34 may be entered into the system manager 826. The system manager 826 may also receive the noise performance expressed as the G/T ratio as described above in addition to the uplink and downlink atmospheric losses 154, 156 as illustrated in FIG. 3 and described above. For ground-based repeater systems evaluated using the evaluation system described herein, the range parameter entered into the system manager 826 may comprise the distance from the transmitting earth station 26 to a ground-based repeater station.

The graphical user interface 830 may be loaded with the component performance parameters 110 (FIGS. 3-4) and the transmitting and receiving earth station 26, 30 (FIG. 4) parameters such as by selecting the repeater configuration load button 204 identified as "Load Budget" in FIG. 4. The graphical user interface 830 may include a system configuration 158 (FIG. 4) selector option comprising a repeater configuration file menu 202 (FIG. 4) for selecting from among a plurality of repeater configuration 104 files (FIG. 3). Each file represents a set of component performance parameters 110 previously loaded into the system manager 826 and defining a given repeater configuration 104. The graphical user interface 830 may communicate and/or display the loaded component performance parameters 110 which may include the gain 16, loss 12, noise figure 118, and/or noise temperature 114 (FIGS. 3-4) of the repeater components 46. The above-mentioned earth station parameters may likewise be displayed on the graphical user interface 830 as described above.

The performance calculator 828 may calculate the predicted repeater performance 208 (FIG. 4) of the repeater path 38 as a function of the parameters initially loaded into the graphical user interface 830 upon selection of a repeater configuration 104 file (FIG. 3). In this regard, the graphical user interface 830 may display the calculated data 212 (FIG. 4) and the calculated RF levels 214 representing the predicted repeater performance 208 (FIG. 4) of the repeater path 38. For example, the graphical user interface 830 may display the predicted downlink EIRP 304 (FIG. 4) and/or the predicted G/T 290 (FIG. 4) of the repeater path 38 based upon the parameters initially loaded into the graphical user interface 830 upon selection of a repeater configuration 104 file.

The graphical user interface 830 may enable reconfiguration of the parameters of the transmitting and receiving earth stations and/or the repeater component performance parameters 110 of at least one of the gain 116, loss 112, noise figure 118, and noise temperature 114 of the repeater components 46 to enable the predicted repeater performance to be within a predetermined range of desired repeater performance. In this regard, the graphical user interface 830 may enable user-adjustment of at least one of the component performance parameters 110 (FIGS. 3-4) and/or transmitting and receiving earth station 26, 30 (FIG. 4) parameters to determine the effect on repeater performance. The graphical user interface 830 may include a parameter adjuster 221 (FIG. 4) for each one of the component performance parameters 110 displayed in the graphical user interface 830. The parameter adjuster 221 may facilitate user-adjustment of the parameters until the predicted repeater performance falls within the predetermined range of desired repeater performance in a manner described above with regard to the methodology illustrated in FIG. 5. For example, a user may adjust the gain 116 and/or loss 112 (FIG. 3) of one or more of the component performance parameters 110 until the predicted downlink EIRP 304 and predicted G/T 290 of the repeater path 38 (FIG. 4) fall within predetermined ranges as described above.

The graphical user interface 830 may additionally include parameter adjusters 221 (FIG. 4) for adjusting other parameters of the repeater components 46. For example, a parameter adjuster 221 may be included for adjusting the HPA amplifier rating 128 (FIG. 4) such that the power output of the travelling wave tube 64 ("TWT") amplifier (i.e., HPA) may be maintained below a maximum power rating to avoid saturation of the TWT 64 amplifier while maximizing (i.e., increasing) the gain of the low noise amplifier (LNA) 56 (FIG. 4) using one of the parameter adjusters 221 to attain a desired repeater performance. In addition, a parameter adjuster 221 may be manipulated to minimize the noise figure of the LNA 56 in a manner to maximize the predicted downlink EIRP 304 (FIG. 4) and/or the predicted G/T 290 (FIG. 4) of the repeater 36. In another example, the graphical user interface 830 may include a parameter adjuster 221 for adjusting the noise temperature 122, gain 124 and miscellaneous losses 126 (FIG. 3) associated with the repeater receiving antenna 44 (FIG. 4) until the predicted repeater performance falls within a predetermined range of the desired performance.

In an embodiment, the repeater path evaluation system 800 may include one or more of the processors 204 for executing instructions of computable readable program instructions 824 that may be installed into the memory device 806. Alternatively, the processor 804 may comprise a multi-processor core having two or more integrated processors cores. Even further, the processor 804 may comprise a main processor and one or more secondary processors integrated on a chip. The processor 804 may also comprise a many-processor system having a plurality of similarly configured processors.

Referring still to FIG. 8, the repeater path evaluation system 800 may further include one or more memory devices 806 which may comprise one or more of volatile or non-volatile storage devices 808. However, the memory device 806 may comprise any hardware device for storing data. For example, the memory device 806 may comprise a random access memory or a cache of an interface and/or integrated memory controller hub which may be included in the communication path 802. The memory device 806 may be configured to permanently and/or temporarily store any one of a variety of different types of data, computer readable code or program instructions 824, or any other type of information. The non-volatile storage device 808 may be provided in a variety of configurations including, but not limited to, a flash memory device, a hard drive, an optical disk, a hard disk, a magnetic tape or any other suitable embodiment for longterm storage. In addition, the non-volatile storage device 808 may comprise a removable device such as a removable hard drive.

The repeater path evaluation system 800 may additionally include one or more of the input/output devices 810 to facilitate the transfer of data between components that may be connected to the repeater path evaluation system 800. The input/output device 810 may be directly and/or indirectly coupled to the repeater path evaluation system 800. The input/output device 810 may facilitate user-input of data or parameters into the system manager 826 by means of a peripheral device such as a keyboard, a mouse, a joystick, a touch screen and any other suitable device for inputting data to the repeater path evaluation system 800. Data such as the component performance parameters 110 may also be entered into the system manager 826 on an autonomous basis or via user command from another system manager (not shown) of another computer system (not shown). The input/output device 810 may further include an output device for transferring data representative of the output of the repeater path evaluation system 800. For example the input/output device 810 may comprise a display device 814 such as a computer monitor or computer screen for displaying results of data processed by the repeater path evaluation system 800. For example, the graphical user interface 830 may display the data loaded into the system manager 826 using the input/output device. The input/output device 810 may optionally include a printer or fax machine for printing a hardcopy of information processed by the repeater path evaluation system 800.

Referring still to FIG. 8, the repeater path evaluation system 800 may include one or more communications devices 812 to facilitate communication of the repeater path evaluation system 800 within a computer network and/or with other processor-based systems. Communication of the repeater path evaluation system 800 with a computer network or with other processor-based systems may be by wireless means and/or by hardwire connection. For example, the communications device 812 may comprise a network interface controller to enable wireless or cable communication between the repeater path evaluation system 800 and a computer network. The communications device 812 may also comprise a modem and/or a network adapter or any one of a variety of alternative device for transmitting and receiving data.

One or more of the operations of the methodology described above for evaluating a repeater path 38 (FIG. 4) as discussed above with regard to FIG. 5 may be performed by the processor 804 and/or by one or more of the system manager 826, the performance calculator 828, and the graphical user interface 830 using the computer readable program instructions 824. Likewise, one or more of the operations of the methodology described above for determining repeater performance of a physical model of the repeater 36 (FIG. 4) during ground testing as described above with regard to FIG. 6 may be performed by the processor 804 and/or by one or more of the system manager 826, the performance calculator 828, and the graphical user interface 830 using the computer readable program instructions 824. Furthermore, one or more of the operations of the methodology described above for evaluating the performance of a repeater 36 (FIG. 4) that has been placed in service for an on-orbit repeater spacecraft (FIG. 1) as described above with regard to FIG. 7 may be performed by the processor 804 and/or by one or more of the system manager 826, the performance calculator 828, and the graphical user interface 830 using the computer readable program instructions 824.

As shown in FIG. 8, the computer readable program instructions 824 may comprise program code which may include computer usable program code and computer readable program code. The computer readable program instructions 824 may be read and executed by the processor 804. The computer readable program instructions 824 may enable the processor 804 to perform one or more operations of the above-described embodiments associated with evaluating a repeater path (FIG. 5), determining repeater performance of a physical model of the repeater path during ground testing (FIG. 6), or evaluating the performance of an in-service repeater (FIG. 7).

Referring still to FIG. 8, the computer readable program instructions 824 may include operating instructions for the repeater path evaluation system 800 and may further include applications and programs. The computer readable program instructions 824 may be contained and/or loaded onto one or more of memory devices 806 and/or non-volatile storage devices 808 for execution by the processor 804 and/or by one or more of the system manager 826, the performance calculator 828, and the graphical user interface 830. As indicated above, one or more of the memory devices 806 and/or non-volatile storage devices 808 may be communicatively coupled to one or more of the remaining components illustrated in FIG. 8 through the communication path 802.

The computer readable program instructions 824 may be contained on tangible or non-tangible, transitory or non-transitory computer readable media 818 and which may be loaded onto or transferred to the repeater path evaluation system 800 for execution by the processor 804. The computer readable program instructions 824 and the computer readable media 818 comprise a computer program product 816. In an embodiment, the computer readable media 818 may comprise computer readable storage media 820 and/or computer readable signal media 822.

The computer readable storage media 820 may comprise a variety of different embodiments including, but not limited to, optical disks and magnetic disks that may be loaded into a drive, a flash memory device or other storage device or hardware for transfer of data onto a storage device such as a hard drive. The computer readable storage media 820 may be non-removably installed on the repeater path evaluation system 800. The computer readable storage media 820 may comprise any suitable storage media and may include, without limitation, a semiconductor system or a propagation medium. In this regard, the computer readable storage media 820 may comprise electronic media, magnetic media, optical media, electromagnetic media, and infrared media. For example, the computer readable storage media 820 may comprise magnetic tape, a computer diskette, random access memory and read-only memory. Non-limiting examples of embodiments of optical disks may include compact disks—read only memory, compact disks—read/write, and digital video disks.

The computer readable signal media 822 may contain the computer readable program instructions 824 and may be embodied in a variety of data signal configurations including, but not limited to, an electromagnetic signal and an optical signal. Such data signals may be transmitted by any suitable communications link including by wireless or hardwire means. For example, the hardwire means may comprise an optical fiber cable, a coaxial cable, a signal wire and any other suitable means for transmitting the data by wireless or by physical means.

Referring still to FIG. 8, the computer readable signal media 822 may facilitate the downloading of the computer readable program instructions 824 to the non-volatile storage or other suitable storage or memory device for use within repeater path evaluation system 800. For example, the computer readable program instructions 824 contained within the computer readable storage media 820 may be downloaded to the repeater path evaluation system 800 over a computer network from a server or client computer of another system.

Any one of a variety of different embodiments of the repeater path evaluation system 800 may be implemented using any hardware device or system capable of executing the computer readable program instructions 824. For example, the processor 804 may comprise a hardware unit configured for performing one or more particular functions wherein the computer readable program instructions 824 for performing the functions may be pre-loaded into the memory device 806.

In an embodiment, the processor 804 may comprise an application specific integrated circuit (ASIC), a programmable logic device, or any other hardware device configured to perform one or more specific functions or operations. For example, a programmable logic device may be temporarily or permanently programmed to perform one or more of the operations related to the methodology of evaluating a repeater path (FIG. 5), determining repeater performance during ground testing of a physical model of the repeater path (FIG. 6), or evaluating the performance of an in-service repeater (FIG. 7). The programmable logic device may comprise a programmable logic array, programmable array logic, a field programmable logic array, and a field programmable gate array and any other suitable logic device, without limitation. In an embodiment, the computer readable program instructions 824 may be operated by the one or more processor 804 and/or by other devices including one or more hardware units in communication with the processor 804. Certain portions of the computer readable program instructions 824 may be the processor 804 and other portions of the computer readable program instructions 824 may be run by the hardware units.

Advantageously, the various embodiments described above provide the ability to predict repeater performance for a given set of repeater components 46 (FIG. 3) with the further technical effect of obviating the need to construct a physical model of the repeater 36 (FIG. 4) and measure the operating characteristics to predict the performance of the repeater 36 in service. In this regard, the technical effect of performing one or more operations of the above-described methodology include the elimination of the need to design a repeater 36 configuration comprised of a given set of repeater components 46, construct one or more physical models of the repeater 36 configurations, measure the operating characteristics of the repeater components 46 when assembled in the repeater path 38 (FIG. 4) to predict repeater performance in service, and then re-design, re-assemble with different repeater components 46, and re-test in an iterative manner until arriving at a repeater configuration having the desired repeater performance. Furthermore, the various advantageous embodiments described above provide the technical effect of increasing the efficiency and accuracy in predicting repeater performance for an infinite variety of repeater configurations operating in a variety of different conditions and noise environments.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of evaluating a bent-pipe repeater path, comprising the steps of:
    identifying parameters of a transmitting earth station and a receiving earth station including the noise temperature of the transmitting and receiving earth station and the noise temperature of space;
    identifying component performance parameters including the gain, loss, and noise temperature of all of the repeater components in the bent-pipe repeater path;
    predicting, using a processor including a non-transitory memory device in an evaluation system prior to building a physical model of a bent pipe repeater, repeater performance of the bent-pipe repeater path as a function of the parameters of the transmitting and receiving earth stations and the component performance parameters of the gain, loss, and noise temperature of all of the repeater components;
    predicting a relative saturation of an amplifier in the bent-pipe repeater path when the amplifier is in an unpowered state, the relative saturation comprising an input power level of the bent-pipe repeater path relative to a saturation point of the repeater component;
    communicating, on a graphical user interface (GUI), the component performance parameters including the gain, loss, and noise temperature of all of the repeater components, the parameters of the transmitting and receiving earth station, and the predicted repeater performance; and
    adjusting the gain, loss, and noise temperature of all of the component performance parameters to manage the predicted repeater performance to be within a predetermined range of desired repeater performance.

2. The method of claim 1 wherein the repeater components include a repeater receiver antenna, the method further comprising the step of:
    adjusting an antenna gain of a repeater receiver antenna until the predicted repeater performance falls within a predetermined range of the desired performance parameters.

3. The method of claim 1 wherein the step of adjusting the component performance parameters comprises:
    adjusting the component performance parameters until at least one of a predicted downlink effective isotropic radiated power (EIRP) and a predicted ratio of gain-to-noise-temperature (G/T) of the repeater path fall within respective predetermined ranges of a desired EIRP and desired G/T.

4. The method of claim 3 wherein the repeater components include a lower noise amplifier (LNA) and a high power amplifier (HPA) having a maximum power rating, the method further comprising the step of:
    maximizing the gain of the LNA to attain the desired repeater performance while maintaining the HPA below the maximum power rating.

5. The method of claim 4 further comprising the step of:
    minimizing the noise figure of the LNA in a manner to maximize the predicted downlink EIRP and the predicted G/T of the repeater.

6. The method of claim 1 wherein the repeater components include a high power amplifier having a maximum power rating, the predicted repeater performance including a saturation of the high power amplifier relative to a repeater input power level, the method further comprising the step of:

adjusting the component performance parameters such that the repeater input power level results in a relative saturation of between 0.0 dBW and approximately −2.0 dBW.

7. The method of claim 1 further comprising the step of: constructing a physical model of the bent-pipe repeater path comprising repeater components having the adjusted component performance parameters that result in the desired repeater performance.

8. The method of claim 1 further comprising the steps of: providing a physical model of the bent-pipe repeater path having input and output ends;
calculating a repeater input power level and a repeater output power level at the respective input and output ends and corresponding to the predicted repeater performance;
applying a test RF signal to the input end, the test RF signal being synthesized and having a magnitude that is substantially equivalent to the calculated repeater input power level;
measuring, using a downlink power meter coupled to the output end, the repeater power output level in response to application of the test RF signal; and
determining actual repeater performance of the physical model based on the difference between the measured repeater output power level and the calculated repeater output power level.

9. A method of determining the performance of a bent-pipe repeater path, comprising the steps of:
providing a physical model of the bent-pipe repeater path having input and output ends;
predicting, using a processor including a non-transitory memory device in an evaluation system prior to building a physical model of the bent pipe repeater, repeater performance of the bent-pipe repeater path as a function of parameters including the noise temperature of a transmitting earth station, a receiving earth station, and space, and component performance parameters of the gain, loss, and noise temperature of all of the repeater components in the bent-pipe repeater path;
calculating a repeater input power level and a repeater output power level at the respective input and output ends and corresponding to the predicted repeater performance
predicting a relative saturation of an amplifier in the bent-pipe repeater path when the amplifier is in an unpowered state, the relative saturation comprising the input power level of the bent-pipe repeater path relative to a saturation point of the repeater component;
applying a test RF signal to the input end, the test RF signal being synthesized and having a magnitude that is substantially equivalent to the calculated repeater input power level;
measuring, using a downlink power meter coupled to the output end, a repeater power output level in response to application of the test RF signal; and
determining actual repeater performance based on the difference between the measured repeater output power level and the calculated repeater output power level.

10. The method of claim 9 further comprising the step of: adjusting the component performance parameters of at least one of the repeater components until the measured repeater output power level is within a predetermined range of the calculated repeater output power level.

11. The method of claim 9 wherein the step of adjusting the component performance parameters comprises:
adjusting the noise temperature of the repeater components.

12. A method of evaluating a bent-pipe repeater path, comprising the steps of:
identifying parameters including noise temperature of transmitting and receiving earth stations and space included in the bent-pipe repeater path;
identifying component performance parameters of repeater components including the gain, loss, and noise temperature of all of the repeater components in the bent-pipe repeater path;
receiving telemetry data from on-orbit spacecraft, the telemetry data including actual repeater performance;
identifying an actual uplink effective isotropic radiated power (EIRP) and an actual uplink atmospheric loss associated with the actual repeater performance;
adjusting the estimated uplink EIRP and the estimated uplink atmospheric loss to be substantially equivalent to the actual uplink EIRP and the actual uplink atmospheric loss;
predicting, using a processor including a non-transitory memory device in an evaluation system prior to building a physical model of a bent pipe repeater, repeater performance as a function of the performance parameters of the repeater components and the transmitting and receiving earth stations and the adjusted estimated uplink EIRP and adjusted estimated uplink atmospheric loss;
predicting a relative saturation of an amplifier in the bent-pipe repeater path when the amplifier is in an unpowered state, the relative saturation comprising an input power level of the repeater path relative to a saturation point of the repeater component;
calculating a difference between the predicted repeater performance and the actual repeater performance; and
adjusting the component performance parameters of the repeater components until the difference between the predicted repeater performance and the actual repeater performance is within a predetermined range.

13. The method of claim 12 wherein the step of calculating predicted repeater performance comprises:
calculating a predicted downlink effective isotropic radiated power (EIRP) and a predicted ratio of gain-to-noise-temperature (G/T) of the repeater path as a function of the component performance parameters of the repeater components and the parameters of the transmitting and receiving earth stations.

14. The method of claim 13 further comprising the step of:
communicating, on a graphical user interface (GUI), the component performance parameters, the parameters of the transmitting and receiving earth station, and the predicted downlink EIRP and G/T.

15. The method of claim 13 further comprising the step of:
adjusting the component performance parameters until at least one of a predicted downlink EIRP and G/T falls within a predetermined range of a desired downlink EIRP and G/T.

16. A bent-pipe repeater path evaluation system, comprising:
a system manager adapted to capture a plurality of discrete parameters including the noise temperature for one or more of a transmitting earth station and receiving earth station and space, and one or more repeater component performance parameters including the gain, loss, and noise temperature of all of the repeater components in the bent-pipe repeater path;

a performance calculator in communication with the system manager and configured to calculate, using a processor including a non-transitory memory device in the evaluation system prior to building a physical model of a bent pipe repeater, repeater performance of the bent-pipe repeater path as a function of the parameters including the noise temperature of the transmitting and receiving earth stations and space, and the gain, loss, and noise temperature of all of the repeater components, the performance calculator predicting a relative saturation of an amplifier in the bent-pipe repeater path when the amplifier is in an unpowered state, the relative saturation comprising an input power level of the bent-pipe repeater path relative to a saturation point of the repeater component; and a graphical user interface displaying the real-time predicted discrete performance parameters for the one or more of the transmitting and receiving earth stations and the gain, loss, and noise temperature of all repeater components;

wherein the graphical user interface enables reconfiguration of at least one of the plurality of discrete parameters of the transmitting and receiving earth stations and the repeater component performance parameters of the gain, loss, and noise temperature to enable the predicted repeater performance to be within a predetermined range of desired repeater performance.

17. The repeater path evaluation system of claim 16 wherein the graphical user interface includes:
one or more parameter adjusters for adjusting the component performance parameters until at least one of a predicted downlink effective isotropic radiated power (EIRP) and a predicted ratio of gain-to-noise-temperature (G/T) of the bent-pipe repeater path are within predetermined ranges of a desired EIRP and desired G/T.

18. The repeater path evaluation system of claim 16 wherein the repeater components include a lower noise amplifier (LNA) and a high power amplifier (HPA) having a maximum power rating, the method further comprising the step of:
maximizing the gain of the LNA to attain the desired repeater performance while maintaining the HPA below the maximum power rating.

19. The repeater path evaluation system of claim 18 further comprising the step of:
minimizing the noise figure of the LNA in a manner to maximize the predicted downlink EIRP and G/T of the repeater.

* * * * *